(12) United States Patent
Takamori et al.

(10) Patent No.: US 10,535,875 B2
(45) Date of Patent: Jan. 14, 2020

(54) POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicants: SUMITOMO CHEMICAL COMPANY, LIMITED, Tokyo (JP); TANAKA CHEMICAL CORPORATION, Fukui-shi, Fukui (JP)

(72) Inventors: Kenji Takamori, Fukui (JP); Hiroyuki Kurita, Tsukuba (JP); Yuichiro Imanari, Fukui (JP); Daisuke Yamashita, Fukui (JP); Kimiyasu Nakao, Fukui (JP); Kyousuke Doumae, Fukui (JP)

(73) Assignees: SUMITOMO CHEMICAL COMPANY, LIMITED, Tokyo (JP); TANAKA CHEMICAL CORPORATION, Fukui-Shi, Fukui (JP)

( * ) Notice: Subject to any disclaimer, the term of this patent is extended or adjusted under 35 U.S.C. 154(b) by 72 days.

(21) Appl. No.: 15/518,471

(22) PCT Filed: Oct. 13, 2015

(86) PCT No.: PCT/JP2015/078879
§ 371 (c)(1),
(2) Date: Apr. 11, 2017

(87) PCT Pub. No.: WO2016/060105
PCT Pub. Date: Apr. 21, 2016

(65) Prior Publication Data
US 2017/0237069 A1      Aug. 17, 2017

(30) Foreign Application Priority Data

Oct. 15, 2014  (JP) .................................. 2014-210577

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/00* (2013.01); *C01G 53/50* (2013.01); *H01M 4/505* (2013.01);
(Continued)

(58) Field of Classification Search
CPC ... H01M 4/505; H01M 4/525; H01M 10/0525
See application file for complete search history.

(56) References Cited

U.S. PATENT DOCUMENTS

| | | | |
|---|---|---|---|
| 9,620,771 B2 | 4/2017 | Kim et al. | |
| 2002/0053663 A1 | 5/2002 | Ito et al. | |

(Continued)

FOREIGN PATENT DOCUMENTS

| | | |
|---|---|---|
| CN | 105378987 A | 3/2016 |
| EP | 1 391 950 A1 | 2/2004 |

(Continued)

OTHER PUBLICATIONS

International Search Report dated Jan. 19, 2016 in PCT/JP2015/078879.

(Continued)

*Primary Examiner* — Karie O'Neill Apicella
(74) *Attorney, Agent, or Firm* — Foley & Lardner LLP

(57) ABSTRACT

A positive electrode active material, which has a crystallite size α/crystallite size β ratio (α/β) of 1 to 1.75 or less, wherein the crystallite size α is within a peak region of (Continued)

2θ=18.7±1° and the crystallite size β is within a peak region of 2θ=44.6±1°, each determined by a powder X-ray diffraction measurement using Cu-Kα ray, and has a composition represented by formula (I) below:

$$\mathrm{Li[Li}_x(\mathrm{Ni}_a\mathrm{Co}_b\mathrm{Mn}_c\mathrm{M}_d)_{1-x}]\mathrm{O}_2 \quad (I)$$

wherein 0≤x≤0.2, 0.3<a<0.7, 0<b<0.4, 0<c<0.4, 0≤d<0.1, a+b+c+d=1, and M is at least one metal selected from the group consisting of Fe, Cr, Ti, Mg, Al and Zr.

10 Claims, 2 Drawing Sheets

(51) Int. Cl.
  *H01M 10/0525* (2010.01)
  *C01G 53/00* (2006.01)
  *H01M 4/02* (2006.01)

(52) U.S. Cl.
  CPC ..... *H01M 10/0525* (2013.01); *C01P 2002/60* (2013.01); *C01P 2004/54* (2013.01); *C01P 2004/61* (2013.01); *C01P 2004/62* (2013.01); *C01P 2004/64* (2013.01); *C01P 2006/11* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2010/0233542 A1 | 9/2010 | Endo et al. |
| 2013/0260248 A1 | 10/2013 | Seki et al. |
| 2014/0193714 A1 | 7/2014 | Kim et al. |
| 2016/0172674 A1 | 6/2016 | Oda et al. |
| 2016/0372749 A1 | 12/2016 | Iida et al. |

FOREIGN PATENT DOCUMENTS

| | | | |
|---|---|---|---|
| EP | 1391950 A1 * | 2/2004 | ......... C01G 45/1228 |
| EP | 3 151 316 A1 | 4/2017 | |
| JP | 2000-195514 A | 7/2000 | |
| JP | 2002-201028 A | 7/2002 | |
| JP | 2004-335278 A | 11/2004 | |
| JP | 2008-147068 A | 6/2008 | |
| JP | 2008-251191 A | 10/2008 | |
| JP | 2012-146639 A | 8/2012 | |
| JP | 2012-169299 A | 9/2012 | |
| JP | 2012-252964 A | 12/2012 | |
| JP | 2013-206552 A | 10/2013 | |
| JP | 2013-206616 A | 10/2013 | |
| JP | 2015-18678 A | 1/2015 | |
| JP | 2015-26454 A | 2/2015 | |
| KR | 1020100085966 A | 7/2010 | |
| KR | 10-2014-0089851 A | 7/2014 | |
| WO | WO 2015-182665 A1 | 12/2015 | |

OTHER PUBLICATIONS

Korean Office Action dated Feb. 12, 2018 in corresponding application No. 10-2017-7011826.
Korean Office Action dated Aug. 3, 2018 in corresponding application No. 10-2017-7011826.
Extended European Search Report dated Apr. 9, 2018 in corresponding application No. 15850691.5.
Office Action dated Aug. 10, 2017 in Korean Patent Application No. 10-2017-7011826.
Japanese Office Action dated Aug. 29, 2019 for corresponding App. No. 2016-554078.
Chinese Office Action dated Oct. 12, 2019 for corresponding Application No. 201580055669.3 (18 pages).

* cited by examiner

POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS-REFERENCE TO RELATED APPLICATIONS

The present application is a U.S. national stage application of International Patent Application No. PCT/JP2015/078879, filed Oct. 13, 2015, which claims the benefit of priority to Japanese Patent Application No. 2014-210577, filed Oct. 15, 2014, the entireties of which are hereby incorporated by reference.

TECHNICAL FIELD

The present invention relates to a positive electrode active material for a lithium secondary battery, a positive electrode for a lithium secondary battery and a lithium secondary battery.

DESCRIPTION OF RELATED ART

Lithium-containing composite metal oxides are used as positive electrode active materials for lithium secondary batteries. Lithium secondary batteries have already been put to practical use not only as compact power supplies for portable telephones, notebook computers and the like, but also as medium- and large-sized power supplies for automobile use, electric power storage use, etc.

As a conventional positive electrode active material for a lithium secondary battery, Patent Document 1 discloses a positive electrode active material for a lithium secondary battery of a non-aqueous electrolytic liquid type, which is a lithium-transition metal composite oxide represented by $Li_{1.00}Ni_{0.33}Co_{0.34}Mn_{0.33}O_2$, with a BET specific surface area of 0.7 m²/g and a crystallite size of 800 Å in a direction perpendicular to the 104 plane determined based on an X-ray diffraction pattern obtained by X-ray diffractometry.

Further, Patent Document 2 discloses a positive electrode active material for a lithium secondary battery of a non-aqueous electrolytic liquid type, which is a lithium-transition metal composite oxide represented by $Li_{1.15}(Ni_{0.34}Co_{0.33}Mn_{0.33})_{0.9682}Mg_{0.001}Ca_{0.03}Na_{0.0008}O_2$, with a crystallite size of 1,580 Å in a direction perpendicular to the 003 plane determined based on an X-ray diffraction pattern obtained by X-ray diffractometry.

DOCUMENTS OF RELATED ART

Patent Document

Patent Document 1: Japanese Unexamined Patent Application Publication No. 2004-335278
Patent Document 2: Japanese Unexamined Patent Application Publication No. 2012-252964

SUMMARY OF THE INVENTION

Problems to be Solved by the Invention

However, a lithium secondary battery using the aforementioned conventional lithium-containing composite metal oxide as a positive electrode active material cannot ensure sufficiently high initial coulombic efficiency.

The initial coulombic efficiency is one of the indices for performance evaluation of a secondary battery. The "initial coulombic efficiency" is a value obtained by (initial discharge capacity)/(initial charge capacity)×100(%). A secondary battery having high initial coulombic efficiency suffers a smaller loss of lithium ions accompanying the initial charging/discharging, and is likely to have a large capacity per volume and weight; therefore, a secondary battery having as high an initial coulombic efficiency as possible has been demanded.

The present invention has been made in view of the above situation, and the object of the present invention is to provide a positive electrode active material which can be used for obtaining a lithium ion battery exhibiting high initial coulombic efficiency. Further, the other objects of the present invention are to provide a positive electrode using such a positive electrode active material for a lithium secondary battery, and to provide a lithium secondary battery using such a positive electrode active material.

Means to Solve the Problems

In order to solve the above problems, the present invention provides a positive electrode active material for a lithium secondary battery, which has a crystallite size α/crystallite size β ratio (α/β) of 1 to 1.75, wherein the crystallite size α is within a peak region of 2θ=18.7±1° and the crystallite size β is within a peak region of 2θ=44.6±1°, each determined by a powder X-ray diffraction measurement using Cu-Kα ray, and has a composition represented by formula (I) below:

$$Li[Li_x(Ni_aCo_bMn_cM_d)_{1-x}]O_2 \quad (I)$$

wherein 0≤x≤0.2, 0.3<a<0.7, 0<b<0.4, 0<c<0.4, 0≤d<0.1, a+b+c+d=1, and M is at least one metal selected from the group consisting of Fe, Cr, Ti, Mg, Al and Zr.

In one embodiment of the present invention, it is preferable that a, b and c in the formula (I) satisfy the following relationship: a≥b+c.

In one embodiment of the present invention, it is preferable that the crystallite size α/crystallite size β ratio (α/β) is 1 to 1.5.

In one embodiment of the present invention, it is preferable that the BET specific surface area of the positive electrode active material for a lithium secondary battery is 0.5 m²/g to 4 m²/g.

In one embodiment of the present invention, it is preferable that the crystallite size β is in the range of 150 Å to 650 Å.

In one embodiment of the present invention, it is preferable that the average primary particle diameter is in the range of 0.05 μm to 1 μm, and the volume-based 50% cumulative particle size $D_{50}$ is in the range of 1 μm to 10 μm.

In one embodiment of the present invention, the ratio ($D_{90}/D_{10}$) of volume-based 90% cumulative particle size $D_{90}$ to volume-based 10% cumulative particle size $D_{10}$ is preferably in the range of 2.0 to 3.5.

In one embodiment of the present invention, the positive electrode active material preferably has a tapped bulk density of 1.2 to 2.0.

The present invention in another aspect thereof provides a positive electrode for a lithium secondary battery, comprising the aforementioned positive electrode active material.

The present invention in still another aspect thereof provides a lithium secondary battery comprising a negative electrode and the aforementioned positive electrode.

Effect of the Invention

According to the present invention, it is possible to provide a positive electrode active material which can be used for obtaining a lithium secondary battery exhibiting high initial coulombic efficiency. Further, it also becomes to provide a positive electrode using such a positive electrode active material for a lithium secondary battery, and to provide a lithium secondary battery using such a positive electrode active material. The positive electrode active material of the present invention for a lithium secondary battery is especially useful for a lithium secondary battery suitable for application in automobiles.

DESCRIPTION OF THE EMBODIMENTS

Figure 1A:
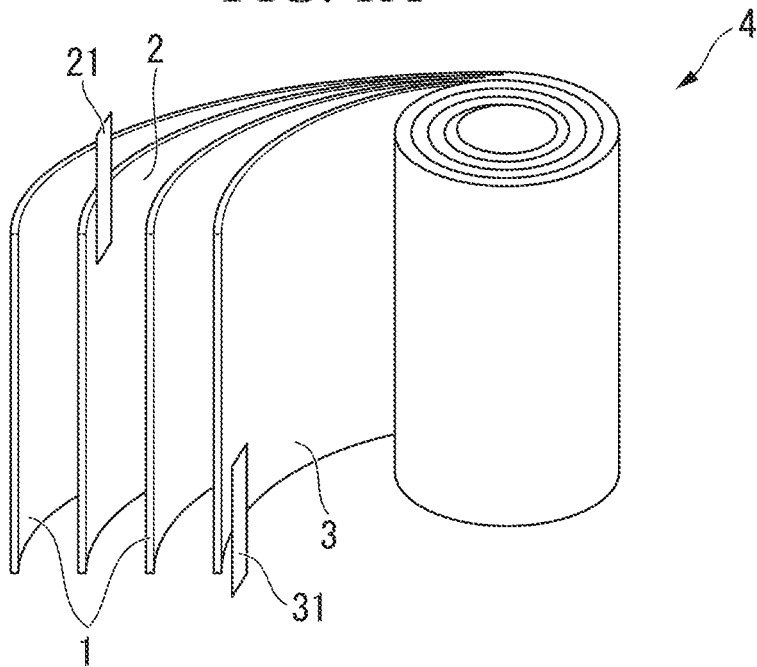
FIG. 1A is a schematic view showing one example of an electrode group to be used in a lithium ion secondary battery.

[Positive Electrode Active Material for Lithium Secondary Battery]

The positive electrode active material for a lithium secondary battery of the present embodiment has a crystallite size α/crystallite size β ratio (α/β) of 1 to 1.75 or less, wherein the crystallite size α is within a peak region of 2θ=18.7±1° and the crystallite size β is within a peak region of 2θ=44.6±1°, each determined by a powder X-ray diffraction measurement using Cu-Kα ray, and has a composition represented by formula (I) below:

$$Li[Li_x(Ni_aCo_bMn_cM_d)_{1-x}]O_2 \qquad (I)$$

wherein $0 \leq x \leq 0.2$, $0.3 < a < 0.7$, $0 < b < 0.4$, $0 < c < 0.4$, $0 \leq d < 0.1$, $a+b+c+d=1$, and M is at least one metal selected from the group consisting of Fe, Cr, Ti, Mg, Al and Zr.

Hereinbelow, the features of the positive electrode active material are explained.

The positive electrode active material for a lithium secondary battery according to the present embodiment has a composition represented by formula (I) below:

$$Li[Li_x(Ni_aCo_bMn_cM_d)_{1-x}]O_2 \qquad (I)$$

wherein $0 \leq x \leq 0.2$, $0.3 < a < 0.7$, $0 < b < 0.4$, $0 < c < 0.4$, $0 \leq d < 0.1$, $a+b+c+d=1$, and M is at least one metal selected from the group consisting of Fe, Cr, Ti, Mg, Al and Zr.

In the positive electrode active material for a lithium secondary battery of the present embodiment, for obtaining a lithium secondary battery with higher cycle performance, x in the formula (I) is preferably 0.01 or more, more preferably 0.02 or more, still more preferably 0.03 or more. For obtaining a lithium secondary battery with higher initial coulombic efficiency, x in the formula (I) is preferably 0.18 or less, more preferably 0.15 or less, still more preferably 0.10 or less.

The upper limit values and lower limit values of x can be arbitrarily combined.

In the present specification, the expression "high cycle characteristics" means that a discharge capacity retention is high.

In the positive electrode active material for a lithium secondary battery of the present embodiment, for obtaining a lithium secondary battery with higher capacity, a in the formula (I) is preferably 0.4 or more, more preferably 0.5 or more, still more preferably 0.55 or more. For obtaining a lithium secondary battery with higher discharge capacity at high discharge rate, a in the formula (I) is preferably 0.65 or less, more preferably 0.62 or less, still more preferably 0.59 or less.

The upper limit values and lower limit values of a can be arbitrarily combined.

For obtaining a lithium secondary battery with higher cycle performance, b in the formula (I) is preferably 0.07 or more, more preferably 0.10 or more, still more preferably 0.13 or more. For obtaining a lithium secondary battery with higher thermal stability, b in the formula (I) is preferably 0.35 or less, more preferably 0.25 or less, still more preferably 0.18 or less.

The upper limit values and lower limit values of b can be arbitrarily combined.

For obtaining a lithium secondary battery with higher cycle performance, c in the formula (I) is preferably 0.10 or more, more preferably 0.15 or more, still more preferably 0.22 or more. For obtaining a lithium secondary battery with higher storage stability under high temperature conditions (e.g., at 60° C.), c in the formula (I) is preferably 0.35 or less, more preferably 0.30 or less, still more preferably 0.28 or less.

The upper limit values and lower limit values of c can be arbitrarily combined.

M in the formula (I) is at least one metal selected from the group consisting of Fe, Cr, Ti, Mg, Al and Zr.

For improving the handling property of the positive electrode active material for a lithium secondary battery, d in the formula (I) is preferably more than 0, more preferably 0.001 or more, still more preferably 0.005 or more. For obtaining a lithium secondary battery with higher discharge capacity at high discharge rate, d in the formula (I) is preferably 0.08 or less, more preferably 0.04 or less, still more preferably 0.02 or less.

The upper limit values and lower limit values of d can be arbitrarily combined.

M in the formula (I) is preferably Al or Zr from the viewpoint of obtaining a lithium secondary battery with higher cycle performance, and is preferably Mg or Al from the viewpoint of obtaining a lithium secondary battery with higher thermal stability. That is, for improving both of the cycle performance and the thermal stability, M is most preferably Al.

In the positive electrode active material for a lithium secondary battery of the present embodiment, for obtaining a lithium secondary battery with higher discharge capacity at high discharge rate under low temperature conditions (e.g., at 0° C.), a, b and c in the formula (I) preferably satisfy the following relationship: $a \geq b+c$, and more preferably satisfy the following relationship: $a > b+c$.

In the positive electrode active material for a lithium secondary battery of the present embodiment, for obtaining a lithium secondary battery with higher thermal stability, b and c in the formula (I) preferably satisfy the following relationship: $b < c$.

(Layered Structure)

Firstly, the crystal structure of the positive electrode active material for a lithium secondary battery of the present embodiment is a layered structure, and is more preferably a hexagonal crystal structure or a monoclinic crystal structure.

The hexagonal crystal structure belongs to any one of the space groups selected from the group consisting of P3, P3$_1$, P3$_2$, R3, P-3, R-3, P312, P321, P3$_1$12, P3$_1$21, P3$_2$12, P3$_2$21, R32, P3 m1, P31m, P3c1, P31c, R3m, R3c, P-31m, P-31c, P-3m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P6$_3$ cm, P6$_3$mc, P-6m2, P-6c2, P-62m, P-62c, P6/mmm, P6/mcc, P6$_3$/mcm, and P6$_3$/mmc.

The monoclinic crystal structure belongs to any one of the space groups selected from the group consisting of P2, P2$_1$, C2, Pm, Pc, Cm, Cc, P2/m, P2$_1$/m, C2/m, P2/c, P2$_1$/c, and C2/c.

Among the aforementioned crystal structures, from the viewpoint of obtaining a lithium secondary battery having high discharge capacity, the particularly preferable crystal structure of the positive electrode active material is a hexagonal crystal structure belonging to R-3m or a monoclinic crystal structure belonging to C2/m.

The space group of the crystal structure of the positive electrode active material for a lithium secondary battery according to the present embodiment can be confirmed as follows.

First, the powder X-ray diffraction measurement is performed with respect to the positive electrode active material for a lithium secondary battery, wherein Cu-Kα is used as a radiation source and the measurement range of a diffraction angle 2θ is set in a range of 10° to 90°, subsequently, Rietveld analysis is performed on the basis of the result (the obtained powder X-ray diffraction pattern), and the crystal structure possessed by the lithium-containing composite metal oxide and the space group in the crystal structure are determined. The Rietveld analysis is a method in which the crystal structure of a material is analyzed using the data of diffraction peaks (diffraction peak intensity and diffraction angle 2θ) in the powder X-ray diffraction measurement of the material, which has been conventionally used (see, for example, "Practice of powder X-ray analysis-Introduction to the Rietveld method" published on Feb. 10, 2002, and edited by Conference for X-ray analysis in The Japan Society for Analytical Chemistry).

(Crystallite Size)

The positive electrode active material for a lithium secondary battery of the present embodiment has a crystallite size α/crystallite size β ratio (α/β) of 1 to 1.75 or less, wherein the crystallite size α is within a peak region of 2θ=18.7±1° (hereinafter, also referred to as "peak A") and the crystallite size β is within a peak region of 2θ=44.6±1° (hereinafter, also referred to as "peak B"), each determined by a powder X-ray diffraction measurement using Cu-Kα ray.

The crystallite size α at the peak A and the crystallite size β at the peak B in the positive electrode active material for a lithium secondary battery of the present embodiment can be confirmed as follows.

First, the powder X-ray diffraction measurement is performed with respect to the positive electrode active material, wherein Cu-Kα is used as a radiation source and the measurement range of a diffraction angle 2θ is set in a range of 10° to 90°, to thereby determine peaks corresponding to the peak A and the peak B. Then, the half width values of the determined peaks are calculated, from which the crystal sizes are calculated by Scherrer equation: D=Kλ/B cos θ (D: crystallite size, K: Scherrer constant, Bs: peak half width value). The determination of crystallite size by the aforementioned formula is a technique that has been conventionally used for this purpose (see, for example, "X-ray structural analysis—determination of arrangement of atoms—", third edition issued Apr. 30, 2002, Yoshio Waseda, Eiichiro Matsubara). Hereinbelow, the determination of the crystal sizes is more specifically explained referring to the drawings, taking as an example the case where the positive electrode active material for a lithium secondary battery has a hexagonal crystal structure belonging to space group R-3m.

Figure 2A:
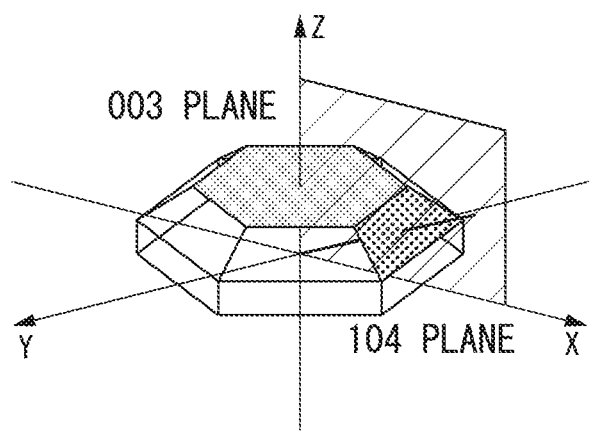
FIG. 2A is a schematic view for explaining the crystallite sizes in the present invention, which schematically shows the 003 plane and the 104 plane in the crystallite.

In FIG. 2A, the 003 plane and the 104 plane in the crystallites are schematically shown. In FIG. 2A, the crystallite size in a direction perpendicular to the 003 plane corresponds to the crystallite size α, and the crystallite size in a direction perpendicular to the 104 plane corresponds to the crystallite size β.

Figure 2B:
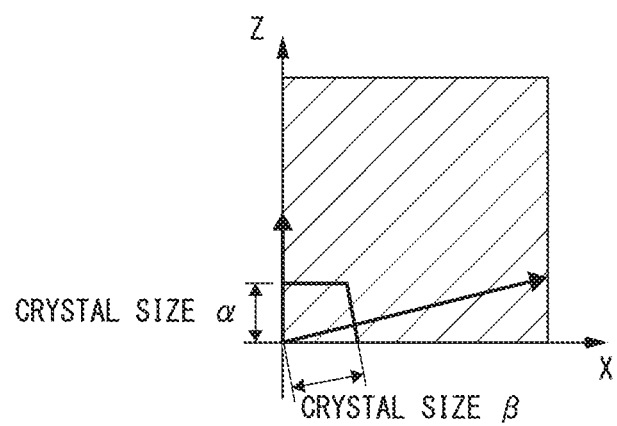
FIG. 2B is a schematic view for explaining the crystallite sizes in the present invention, which schematically shows the relationship between the crystallite size α that can be calculated from a peak A described later, and the crystallite size β that can be calculated from a peak B described later.

FIG. 2B is a schematic view showing the relationship between the crystallite size α that can be calculated from the peak A, and the crystallite size β that can be calculated from the peak B.

The larger value exceeding 1 of the crystallite size ratio α/β indicates the anisotropical growth of crystallite parallel to the z axis in FIG. 2A, and the value of α/β closer to 1 indicates the isotropical growth of crystallite.

In the present embodiment, for obtaining a lithium secondary battery with higher discharge capacity, the value of α/β is preferably more than 1, more preferably 1.05 or more, and still more preferably 1.1 or more. For obtaining a lithium secondary battery with higher initial coulombic efficiency, the value of α/β is preferably 1.5 or less, more preferably 1.4 or less, still more preferably 1.3 or less.

The upper limit values and lower limit values of α/β can be arbitrarily combined.

The α/β ratio in the positive electrode active material for a lithium secondary battery of the present embodiment can be controlled by adjusting the composition and particle form of the metal composite compound described later, and the BET specific surface area of and the calcination conditions for producing the lithium-containing composite metal oxide described later. Particularly, the α/β ratio of the positive electrode active material for a lithium secondary battery can be readily controlled to fall within the range of 1 to 1.75 by adjusting the BET specific surface area of the metal composite compound to fall within the range of 30 m$^2$/g to 100 m$^2$/g and adjusting the calcination conditions.

For obtaining a lithium secondary battery with higher cycle performance, the crystallite size α is preferably 1,000 Å or less, more preferably 750 Å or less, and still more preferably 600 Å or less. For obtaining a lithium secondary battery with higher charge capacity, the crystallite size α is preferably 200 Å or more, more preferably 250 Å or more, and still more preferably 300 Å or more.

The upper limit values and lower limit values of a can be arbitrarily combined.

For obtaining a lithium secondary battery with higher cycle performance, the crystallite size β is preferably 650 Å or less, more preferably 600 Å or less, still more preferably 550 Å or less, and especially preferably 500 Å or less. For obtaining a lithium secondary battery with higher charge capacity, the crystallite size β is preferably 150 Å or more, more preferably 200 Å or more, and still more preferably 250 Å or more.

The upper limit values and lower limit values of β can be arbitrarily combined.

(Particle Diameter)

As to the form of particles of the positive electrode active material for a lithium secondary battery of the present embodiment, the positive electrode active material is in the form of secondary particles formed by aggregation of primary particles, or a mixture of primary particles and secondary particles formed by aggregation of primary particles. In the present embodiment, for obtaining a lithium secondary battery with higher charge capacity, the average primary particle diameter of the positive electrode active material for a lithium secondary battery is preferably 0.05 µm or more, more preferably 0.08 µm or more, still more preferably 0.1 µm or more. For obtaining a lithium secondary battery with higher initial coulombic efficiency, the average primary particle diameter is preferably 1 µm or less, more preferably 0.7 µm or less, and still more preferably 0.5 µm or less.

The upper limit values and lower limit values of the average primary particle diameter can be arbitrarily combined.

The average primary particle diameter can be measured by the SEM observation.

The crystallite sizes and the average primary particle diameter of the positive electrode active material for a lithium secondary battery of the present embodiment can be controlled by adjusting the primary particle diameter of the metal composite compound described later, and the calcination conditions for producing the lithium-containing composite metal oxide described later.

In the present embodiment, for obtaining a lithium secondary battery with higher discharge capacity under low temperature conditions (e.g., at 0° C.), the volume-based 50% cumulative particle size $D_{50}$ of the positive electrode active material for a lithium secondary battery is preferably 10 µm or less, more preferably 8 µm or less, still more preferably 7 µm or less. For improving the electrode density, the volume-based 50% cumulative particle size $D_{50}$ is preferably 1 µm or more, more preferably 2 µm or more, and still more preferably 3 µm or more.

The volume-based 50% cumulative particle size $D_{50}$ can be measured by the following method (laser diffraction scattering method).

First, 0.1 g of a powder of the positive electrode active material for a lithium secondary battery is added to 50 ml of 0.2 wt % aqueous solution of sodium hexametaphosphate, thereby obtaining a dispersion with the powder dispersed therein. The obtained dispersion is subjected to a particle size distribution measurement using a laser scattering particle size distribution measuring apparatus (Mastersizer MS2000, manufactured by Malvern Instruments Ltd.), whereby the volume-based cumulative particle size distribution curve is obtained.

From the obtained cumulative particle size distribution curve, the particle size at a 50% cumulation measured from the smallest particle side is determined as the volume-based 50% cumulative particle size ($D_{50}$) and as the secondary particle size of the positive electrode active material for a lithium secondary battery. Similarly, the particle diameter at a 10% cumulation measured from the smallest particle side is determined as the volume-based 10% cumulative particle size ($D_{10}$), and the particle diameter ($D_{90}$) at a 90% cumulation measured from the smallest particle side is determined as the 90% cumulative diameter.

In the present embodiment, for improving the electrode density, the ratio ($D_{90}/D_{10}$) of the volume-based 90% cumulative particle size $D_{90}$ to the volume-based 10% cumulative particle size $D_{10}$ is preferably 2 or more, more preferably 2.2 or more, and still more preferably 2.4 or more. For obtaining a lithium secondary battery with higher discharge capacity at high discharge rate, the ratio ($D_{90}/D_{10}$) is preferably 3.5 or less, and more preferably 3.0 or less.

In the present embodiment, a smaller value of ($D_{90}/D_{10}$) means a narrower particle size distribution, whereas a larger value of ($D_{90}/D_{10}$) means a broader particle size distribution.

The volume-based 10% cumulative particle size $D_{10}$, volume-based 50% cumulative particle size $D_{50}$, volume-based 90% cumulative particle size $D_{90}$ and ratio ($D_{90}/D_{10}$) of the positive electrode active material for a lithium secondary battery of the present embodiment can be controlled by adjusting the secondary particle diameter and particle diameter distribution of the metal composite compound described later.

(BET Specific Surface Area)

In the present embodiment, for obtaining a lithium secondary battery with higher discharge capacity at high discharge rate, the BET specific surface area of the positive electrode active material for a lithium secondary battery is preferably 0.5 $m^2/g$ or more, more preferably 0.8 $m^2/g$ or more, still more preferably 1 $m^2/g$ or more. Further, for improving the handling property, the BET specific surface area is preferably 4 $m^2/g$ or less, more preferably 3.8 $m^2/g$ or less, and still more preferably 3.5 $m^2/g$ or less.

The upper limit values and lower limit values of the BET specific surface area can be arbitrarily combined.

The BET specific surface area of the positive electrode active material for a lithium secondary battery of the present embodiment can be controlled by adjusting the BET specific surface area of the metal composite compound described later, and the calcination conditions for producing the lithium-containing composite metal oxide described later.

(Tapped Bulk Density)

In the present embodiment, for obtaining a lithium secondary battery with higher discharge capacity at high discharge rate, the tapped bulk density of the positive electrode active material for a lithium secondary battery is preferably 1.2 g/cc or more, more preferably 1.3 g/cc or more, still more preferably 1.4 g/cc or more. Further, for obtaining an electrode with improved impregnation with an electrolytic liquid, the tapped bulk density is preferably 2.0 g/cc or less, more preferably 1.95 g/cc or less, and still more preferably 1.9 g/cc or less.

The tapped bulk density can be measured in accordance with JIS R 1628-1997.

The tapped bulk density of the positive electrode active material for a lithium secondary battery of the present embodiment can be controlled by adjusting the particle form of the metal composite compound described later, and the calcination conditions for producing the lithium-containing composite metal oxide described later.

The positive electrode active material of the present invention for a lithium secondary battery has high initial coulombic efficiency. The reason therefor is presumed to be as follows.

In the positive electrode active material for a lithium secondary battery of the present invention, the ratio ($\alpha/\beta$) of the crystallite size $\alpha$ to the crystallite size $\beta$ is set to fall within a predetermined range. The crystallite size $\alpha$ and the crystallite size $\beta$ represent crystallite sizes as viewed in different directions, and the ratio thereof ($\alpha/\beta$) represents a morphology of the crystallite. In the present invention, controlling the ratio ($\alpha/\beta$) of the crystallite size $\alpha$ to the crystallite size $\beta$ to fall within a predetermined range, namely, formation of the crystallites with highly isotropic morphology, is considered to cause the crystal planes where insertion and extraction of lithium take place during the charging and discharging to be uniformly distributed throughout the positive electrode active material for a lithium secondary battery, whereby a high initial coulombic efficiency can be achieved.

Furthermore, the reduced crystallite size is considered to make it possible to reduce the volume change during charge and discharge, which results in improved cycle performance.

[Method for Producing Lithium-Containing Composite Metal Oxide]

In producing the lithium-containing composite metal oxide of the present invention, it is preferred that a metal composite compound is first prepared, which includes essential metals other than lithium, i.e., Ni, Co and Mn, and at least one optional metal selected from Fe, Cr, Ti, Mg, Al and Zr, and then the metal composite compound is baked with a suitable lithium salt. As the metal composite compound, it is preferable to use a metal composite hydroxide or a metal composite oxide. Hereinbelow, as to one example of the method for producing the positive electrode active material, explanations are made separately on the step of producing the metal composite compound and the step of producing the lithium-containing composite metal oxide.

(Step of Producing Metal Composite Compound)

The metal composite compound can be produced by the conventionally known batch method or co-precipitation method.

Hereinbelow, the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a metal composite hydroxide represented by $Ni_sCo_tMn_u(OH)_2$, wherein s+t+u=1.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the aforementioned $Ni_sCo_tMn_u(OH)_2$. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_sCo_tMn_u(OH)_2$. The reaction is performed with the temperature in the reaction vessel being regulated, for example, within the range of 10° C. to 60° C., preferably 20° C. to 60° C. and the pH value in the reaction vessel being regulated, for example, within the range of 9 to 13, preferably 10 to 13, while appropriately agitating the content of the reaction vessel. With respect to the reaction vessel, one which allows the overflow for separation of the precipitated reaction product can be used.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be washed with weak acid water. In the above example, a nickel-cobalt-manganese composite hydroxide is produced; however, a nickel-cobalt-manganese composite oxide may be produced instead.

By controlling the primary particle diameter, secondary particle diameter, and BET specific surface area of the metal composite compound obtained by the aforementioned method, it is possible to control various properties of the lithium-containing composite metal oxide to be finally obtained as a result of carrying out the process as described below, i.e., primary particle diameter, secondary particle diameter, and BET specific surface area. The desired values of the aforementioned properties of the metal composite compound can be obtained by adjusting the concentration of the metal salts to be supplied to the reaction vessel, stirring speed, reaction temperature, and reaction pH. For example, the BET specific surface area can be increased by increasing the reaction pH when the reaction temperature is constant. Alternatively, for example, the BET specific surface area can be increased by increasing the reaction temperature when the reaction pH is constant. Further, for realizing a desired particle morphology, a bubbling with various gases such as inert gases (e.g., nitrogen, argon and carbon dioxide), air and oxygen may be carried out as well in addition to the control of the aforementioned conditions. Furthermore, by controlling the calcination temperature to be described later as well as the aforementioned properties of the metal composite compound, it is possible to control the respective crystallite sizes of the lithium-containing composite metal oxide to fall within the ranges intended by the present invention. Therefore, controlling the calcination temperature is as important as controlling the properties of the metal composite compound.

(Step of Producing Lithium-Containing Composite Metal Oxide)

After drying the metal composite oxide or the metal composite hydroxide, the dried product is mixed with a lithium salt.

The drying conditions are not particularly limited, and may be, for example, any of the following conditions: conditions under which the metal composite oxide or the metal composite hydroxide is not oxidized nor reduced (i.e., drying conditions that leave each of the metal composite oxide and the metal composite hydroxide as it is), conditions under which the metal composite hydroxide is oxidized (i.e., drying conditions that oxidize the hydroxide into the oxide), and conditions under which the metal composite oxide is reduced (i.e., drying conditions that reduce the oxide into the hydroxide).

For providing conditions which do not cause oxidation nor reduction, it is possible to use an inert gas such as nitrogen or a noble gas (e.g., helium and argon). For providing conditions which oxidize the metal composite hydroxide, the drying may be carried out in an atmosphere of oxygen or air. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the metal composite oxide or the metal composite hydroxide, the resulting may be subjected to appropriate classification. The aforementioned lithium salt and the metal composite oxide or hydroxide are used in respective amounts determined in view of the composition ratio of the end product. For example, when using a nickel-cobalt-manganese composite hydroxide, the lithium salt and the metal composite hydroxide are used in a ratio corresponding to the composition ratio of $[Li_r(Ni_sCo_tMn_u)_{1-r}]O_2$ (wherein, s+t+u=1). By calcining a mixture of the nickel-cobalt-manganese composite hydroxide and the lithium salts, a lithium-nickel-cobalt-manganese composite oxide can be obtained. In order to obtain a uniform lithium-nickel-cobalt-manganese composite oxide, r is preferably more than 0, more preferably 0.01 or more, and still more preferably 0.02 or more. In order to obtain a lithium-nickel-cobalt-manganese composite oxide with high purity, r is preferably 0.2 or less, more preferably 0.15 or less, and still more preferably 0.1 or less.

The upper limit values and lower limit values of r can be arbitrarily combined.

The calcination may be carried out in dried air, an oxygen atmosphere, an inert atmosphere or the like depending on the desired composition, and may include a plurality of heating steps if necessary.

The temperature for calcination of the aforementioned metal composite oxide or metal composite hydroxide and lithium compounds such as lithium hydroxide or lithium carbonate is not particularly limited, but is preferably 600° C. to 900° C., more preferably 650° C. to 850° C., and most preferably 680° C. to 800° C. When the calcination temperature is below 600° C., it is likely to cause a drawback that a charge capacity decreases. This may be attributable to a structural factor disturbing the movement of Li, which is inherently caused by the calcination at a temperature below the temperature region.

On the other hand, a calcination temperature exceeding 900° C. is likely to cause problems related to production process such as difficulty in obtaining a composite oxide having a desired composition due to volatilization of Li and a problem of inferior initial coulombic efficiency. The reason for this is considered to reside in that the temperature exceeding 900° C. increases the primary particle growth rate, which promotes the anisotropic growth of the crystallites in a direction parallel to the z axis in FIG. 2A, thereby deteriorating the uniformity of the particles. Another conceivable factor is the structural unstability caused by increase in local loss of Li.

Furthermore, the higher the temperature, the more anisotropic growth of the crystallites is promoted in a direction parallel to the z axis in FIG. 2A, which increases the size of each crystallite itself. It is considered that, as the crystallite size increases, the influence of the volume change of the crystal structure on the secondary particles becomes more serious, wherein the volume change occurs during the charging/discharging which involve insertion and extraction of Li, which is likely to result in phenomena such as cracking of secondary particles that deteriorate the cycle performance. With the calcination temperature being in a range of 680° C. to 800° C., a battery having a particularly high coulombic efficiency and an improved cycle performance can be manufactured. The calcination time is preferably 0.5 hours to 20 hours. The calcination time exceeding 20 hours tends to result in substantially lower battery performance due to volatilization of Li. The calcination time less than 0.5 hours tends to result in a poor crystal growth and an inferior battery performance. It is also effective to perform a precalcination in advance of the aforementioned calcination. Such a precalcination is preferably performed at a temperature in the range of 300 to 800° C. for 0.5 to 10 hours. The total calcination time may possibly be shortened by carrying out the precalcination.

The lithium-containing composite metal oxide after the calcination is pulverized and then appropriately classified, thereby obtaining the positive electrode active material applicable to a lithium secondary battery.

[Lithium Secondary Battery]

Next, a positive electrode using the aforementioned lithium-containing composite metal oxide of the present embodiment as a positive electrode active material for a lithium secondary battery, and a lithium secondary battery including the positive electrode will be described while explaining the construction of the lithium secondary battery.

An example of the lithium secondary battery of the present embodiment includes a positive electrode, a negative electrode, a separator sandwiched between the positive electrode and the negative electrode, and an electrolyte disposed between the positive electrode and the negative electrode.

Figure 1B:
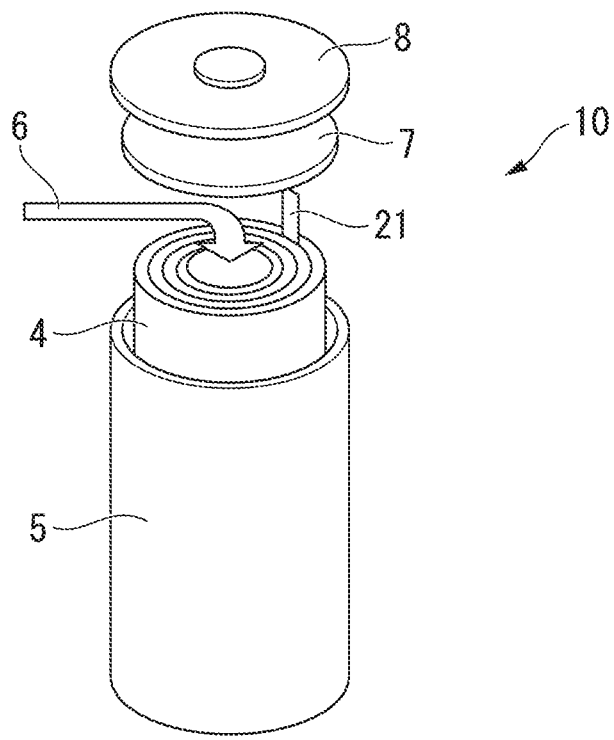
FIG. 1B is a schematic view showing one example of the lithium ion secondary battery using the electrode group shown in FIG. 1A.

FIG. 1A is a schematic view showing one example of an electrode group to be used in a lithium ion secondary battery, and FIG. 1B is a schematic view showing one example of the lithium secondary battery using the electrode group shown in FIG. 1A. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound to obtain an electrode group 4.

Next, as illustrated in FIG. 1B, the electrode group 4 and an insulator (not shown) are put in a battery can 5, then, the bottom of the can is sealed, an electrolytic solution 6 is impregnated into the electrode group 4, and an electrolyte is disposed between the positive electrode 2 and the negative electrode 3. Furthermore, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinafter, the respective components will be described.
(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.
(Conductive Material)

As the conductive material included in the positive electrode active material of the present embodiment, a carbonaceous material can be used. Examples of the carbonaceous material include a graphite powder, a carbon black (such as acetylene black) and a fibrous carbonaceous material. Since carbon black is a microparticle and has a large surface area, the addition of only a small amount of the carbon black to the positive electrode mix increases the conductivity within the positive electrode, and improves the charge and discharge efficiency and the output performance as well; however, too large an amount of carbon black deteriorates the binding strength of the binder exerted not only between the positive electrode mix and the positive electrode current collector but also within the positive electrode mix, resulting in an adverse factor that increases an internal resistance.

The amount of the conductive material in the positive electrode mix is preferably from 5 parts by mass to 20 parts by mass, relative to 100 parts by mass of the positive electrode active material for a lithium secondary battery. This amount may be decreased when using a fibrous carbonaceous material such as a graphitized carbon fiber or a carbon nanotube as the conductive material.
(Binder)

As the binder included in the positive electrode active material of the present embodiment, a thermoplastic resin can be used. Examples of the thermoplastic resin include fluororesins such as polyvinylidene fluoride (hereinafter, in some cases, referred to as PVdF), polytetrafluoroethylene (hereinafter, in some cases, referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.
(Positive Electrode Current Collector)

As the positive electrode current collector included in the positive electrode active material of the present embodiment, it is possible to use a strip-shaped member composed of a metal material such as Al, Ni, or stainless steel as a component material. It is especially preferred to use a current collector which is made of Al and is shaped into a thin film because of its low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.
(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.
(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and $SiO$; oxides of titanium represented by the formula: $TiO_x$ (wherein x is an positive integer) such as $TiO_2$ and $TiO$; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and $FeO$; oxides of tin represented by the formula: $SnO_x$ (wherein x is an positive integer) such as $SnO_2$ and $SnO$; oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and $TiS$; sulfides of vanadium represented by the formula: $VS_x$ (wherein x is an positive integer) such as $V_3S_4$, $VS_2$, and $VS$; sulfides of iron represented by the formula: $FeS_x$ (wherein x is an positive integer) such as $Fe_3S_4$, $FeS_2$ and FeS; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and SnS; sulfides of tungsten represented by the formula: $WS_x$ (wherein x is an positive integer) such as $WS_2$; sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, and tin metals.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode materials, carbonaceous materials composed mainly of graphite such as natural graphite or artificial graphite are preferably used for the following reasons: the potential of the negative electrode hardly changes during charging from a uncharged state to a fully charged state (the potential flatness is favorable), the average discharge potential is low, the capacity retention after repeated charge/discharge cycles is high (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and specific examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

In the present embodiment, for satisfactory permeation of the electrolyte through the separator during the use (charge and discharge) of the battery, the separator preferably has an air resistance of 50 sec/100 cc to 300 sec/100 cc, more preferably 50 sec/100 cc to 200 sec/100 cc as measured by Gurley method prescribed in JIS P 8117.

The porosity of the separator is preferably 30% by volume to 80 by volume, and more preferably 40% by volume to 70% by volume. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein FSI means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and y-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and an ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. In some cases, the use of such a solid electrolyte may further improve the safety of the lithium secondary battery.

In the lithium secondary battery of the present embodiment, the solid electrolyte, when used, may serve as a separator. In such a case, the separator may be omitted.

The positive electrode active material having features as described above uses the lithium-containing composite metal oxide of the present embodiment as described above, whereby the positive electrode active material can enable a lithium ion battery using the positive electrode active material to exhibit higher initial coulombic efficiency than the conventional lithium secondary batteries.

The positive electrode having features as described above uses the positive electrode active material of the present embodiment as described above, whereby the positive electrode can enable a lithium ion battery using the positive electrode to exhibit higher initial coulombic efficiency than the conventional lithium secondary batteries.

Furthermore, the lithium secondary battery having features as described above has the aforementioned positive electrode, and hence is capable of higher initial coulombic efficiency than the conventional lithium secondary batteries.

EXAMPLES

Hereinbelow, the present invention will be described in more detail with reference to the Examples.

In the present Examples, evaluations of the produced positive electrode active material for a lithium secondary battery, positive electrode for a lithium secondary battery and lithium secondary battery were implemented as follows.
(1) Evaluation of Positive Electrode Active Material for Lithium Secondary Battery
1. Composition Analysis of Positive Electrode Active Material for Lithium Secondary Battery The composition analysis of the lithium-containing composite metal oxide manufactured by the method described below was carried out using an inductively coupled plasma emission spectrometer (SPS3000, manufactured by SII Nano Technology Inc.) after a sample powder of the lithium-containing composite metal oxide was dissolved in hydrochloric acid.
2. Measurement of Average Primary Particle Diameter of Positive Electrode Active Material for Lithium Secondary Battery First, a sample powder of lithium-containing composite metal oxide was placed on a conductive sheet attached onto a sample stage, and SEM observation was carried out by radiating an electron beam with an accelerated voltage of 20 kV using a JSM-5510 manufactured by JEOL Ltd. 50 primary particles were arbitrarily selected in an image (SEM photograph) obtained from the SEM observation, parallel lines were drawn from a certain direction so as to sandwich the projection image of each primary particle, and the distance between the parallel lines (Feret diameter) was measured as the particle diameter of the primary particle. The arithmetic average value of the obtained particle diameters is regarded as the average primary particle diameter of the lithium-containing composite metal oxide. In addition, the above "certain direction" means the same single direction (for example, the horizontal direction in the photograph) in the SEM photograph with respect to all the particles to be measured.
3. Measurement of Cumulative Particle Size of Positive Electrode Active Material for Lithium Secondary Battery First, 0.1 g of a powder of the lithium-containing composite metal oxide was added to 50 ml of 0.2 wt % aqueous solution of sodium hexametaphosphate, thereby obtaining a dispersion with the powder dispersed therein. The obtained dispersion was subjected to a particle size distribution measurement using a laser scattering particle size distribution measuring apparatus (Mastersizer 2000, manufactured by Malvern Instruments Ltd.), whereby the volume-based particle size distribution curve was obtained. From the obtained cumulative particle size distribution curve, the particle sizes at 10% cumulation, 50% cumulation and 90% cumulation measured from the smallest particle side were determined as $D_{10}$, $D_{50}$ and $D_{90}$, respectively.
4. Measurement of Crystallite Size of Positive Electrode Active Material for Lithium Secondary Battery The powder X-ray diffraction analysis of the lithium-containing composite metal oxide was carried out using an X-ray diffractometer (X'Pert PRO, manufactured by PANalytical). The obtained lithium-containing composite metal oxide was charged onto a specially designed substrate, and the measurement was carried out using a Cu-Kα radiation source with a diffraction angle in the range of $2\theta=10°$ to $90°$, thereby obtaining a powder X-ray diffraction pattern. From the X-ray powder diffraction pattern, the half width value of the peak corresponding to the peak A and the half width value of the peak corresponding to the peak B were determined using a comprehensive X-ray powder diffraction pattern analyzing software JADES, from which the crystallite sizes α and β were calculated by the Scherrer equation.
5. Measurement of BET Specific Surface Area of Positive Electrode Active Material for Lithium Secondary Battery The BET specific surface area was measured using a FLOWSORB 112300 manufactured by Micromeritics Instrument Corporation after 1 g of the sample powder of lithium-containing composite metal oxide was dried at 150° C. in a nitrogen atmosphere for 15 minutes.
(2) Production of Positive Electrode A lithium-containing composite metal oxide (positive electrode active material) obtained by a production method described below, a conductive material (acetylene black), and a binder (PVdF) were mixed and kneaded so as to obtain a composition of the positive electrode active material, the conductive material, and the binder at a mass ratio of 92:5:3, thereby preparing a paste-form positive electrode mix. In preparation of the positive electrode mix, N-methyl-2-pyrrolidone was used as an organic solvent.

The obtained positive electrode mix was applied to a 40 μm-thick Al foil as a current collector, and was dried in a vacuum at 150° C. for 8 hours, thereby obtaining a positive electrode. The electrode area of the positive electrode was set to 1.65 cm².

(3) Production of Lithium Secondary Battery (Coin-Type Half Cell)

The positive electrode produced in the "(2) Production of Positive Electrode for Lithium Secondary Battery" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolytic solution used was prepared by dissolving 1 mol/l of $LiPF_6$ in a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 30:35:35. Hereinafter, the electrolytic solution may also be referred to as "$LiPF_6$/EC+DMC+EMC".

Next, metal lithium used as a negative electrode was placed on the laminate film separator, covered with a top lid through a gasket, and swaged using a swage, thereby producing a lithium secondary battery (coin-type battery R2032). Hereinafter, this battery may also be referred to as "coin-type half cell".

(4) Initial Charge/Discharge Test

An initial charge/discharge test was carried out under conditions described below using the coin-type half cell produced in the "(3) Production of Lithium Secondary Battery (Coin-type Half Cell)".

<Discharge Rate Test>

Test temperature: 25° C.

Constant current/constant voltage charging: maximum charge voltage of 4.3 V, charge time of 8 hours, and charge current of 0.2 CA.

Constant Current Discharging: minimum discharge voltage of 2.5 V.

(5) Production of Lithium Secondary Battery (Coin-Type Full Cell)

The following operations were carried out in an argon atmosphere within a glove box.

The positive electrode produced in the "(2) Production of Positive Electrode" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolytic solution used was prepared by dissolving vinylene carbonate and $LiPF_6$ in a mixture of ethylene carbonate, dimethyl carbonate and ethyl methyl carbonate with a volume ratio of 16:10:74 such that the amounts of vinylene carbonate and $LiPF_6$ became 1 vol % and 1.3 mol/L respectively.

Next, an artificial graphite (MAGD, manufactured by Hitachi Chemical Co., Ltd.) used as a negative electrode was placed on the laminate film separator, covered with a top lid through a gasket, and then swaged using a swage, thereby producing a lithium secondary battery (coin-type battery R2032). Hereinafter, this battery may also be referred to as "coin-type full cell".

(6) Cycle Test

A negative electrode was activated under conditions described below using the coin-type full cell produced in the "(3) Production of Lithium Secondary Battery (Coin-type Full Cell)". In the activation treatment, the charge capacity and the discharge capacity were measured as follows.

<Activation of Negative Electrode>

Treatment temperature: 25° C.

Charge conditions: Maximum charge voltage 4.2 V, charge time 5 hours, and charge current 0.2 CA Discharge conditions: Minimum discharge voltage 2.7 V, discharge time 5 hours, and discharge current 0.2 CA <Cycle Test>

Using the coin-type battery having been subjected to the aforementioned charge/discharge test, a cycle test of 300 cycles was carried out to evaluate the battery life and the discharge capacity retention after 300 cycles was calculated by the formula described below. The higher discharge capacity retention after 300 cycles means longer battery life.

Discharge capacity retention after 300 cycles (%)=discharge capacity at the 300th cycle/discharge capacity at the 1st cycle×100

<Conditions for Cycle Test>

Test temperature: 60° C.

Charge conditions: Maximum charge voltage 4.1 V, charge time 0.5 hours, and charge current 2.0 CA Time of pause after charge: 10 minutes Discharge conditions: Minimum discharge voltage 3.0 V, discharge time 0.5 hours, and discharge current 2.0 CA Time of pause after discharge: 10 minutes In this test, one cycle is a set of charge, pause of charge, discharge and pause of discharge which were performed in this order.

Example 1

1. Production of Positive Electrode Active Material 1 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.60:0.20:0.20, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.4, thereby obtaining nickel-cobalt-manganese composite hydroxide particles. The obtained particles were washed with water after filtration, and dried at 100° C., to thereby obtain a nickel-cobalt-manganese composite hydroxide 1. The BET specific surface area of the nickel-cobalt-manganese composite hydroxide 1 was 39.9 m²/g.

The thus obtained nickel-cobalt-manganese composite hydroxide 1 and a lithium carbonate powder were weighed such that Li/(Ni+Co+Mn)=1.12, followed by mixing. The resulting was calcined in ambient atmosphere at 760° C. for 5 hours, thereby obtaining an intended positive electrode active material 1 for a lithium secondary battery.

2. Evaluation of Positive Electrode Active Material 1 for Lithium Secondary Battery The composition analysis of the obtained positive electrode active material 1 for a lithium secondary battery was performed and the results were applied to the composition formula (I). As a result, it was found that x=0.06, a=0.60, b=0.20, c=0.20, and d=0.00.

The crystallite sizes $\alpha$ and $\beta$ calculated from peaks A and B of the positive electrode active material 1 for a lithium secondary battery were 407 Å and 390 Å, respectively, and the ratio ($\alpha/\beta$) of the crystallite size $\alpha$ to the crystallite size $\beta$ was 1.04.

The primary particle diameter and the volume-based 50% cumulative particle size $D_{50}$ of the positive electrode active material 1 for a lithium secondary battery were respectively 0.15 μm and 4.8 μm. Further, the volume-based 10% cumulative particle size $D_{10}$ and the volume-based 90% cumulative particle size $D_{90}$ were respectively 2.6 μm and 7.4 μm, and the value of $[D_{90}/D_{10}]$ was 2.8.

The BET specific surface area of the positive electrode active material 1 for a lithium secondary battery was 3.2 m$^2$/g. The tapped bulk density of the positive electrode active material 1 was 1.52 g/cc.

3. Evaluation of Lithium Secondary Battery

A coin-type half cell was produced using the positive electrode active material 1 for a lithium secondary battery, and an initial charge/discharge test was carried out. As a result, the initial charge capacity, the initial discharge capacity and the initial coulombic efficiency were respectively 183 mAh/g, 176 mAh/g and 96.2%.

Example 2

1. Production of Positive Electrode Active Material 2 for Lithium Secondary Battery A nickel-cobalt-manganese composite hydroxide 2 was produced following the same procedure as in Example 1 except that the temperature of the solution in the reaction vessel was set at 45° C., and an aqueous sodium hydroxide solution was dropwise added to the reaction vessel at an appropriate timing such that the pH of the solution in the reaction vessel became 12.8. The BET specific surface area of the nickel-cobalt-manganese composite hydroxide 2 was 73.4 m$^2$/g.

The thus obtained nickel-cobalt-manganese composite hydroxide 2 and a lithium carbonate powder were weighed such that Li/(Ni+Co+Mn)=1.12, followed by mixing. The resulting was calcined in ambient atmosphere at 760° C. for 5 hours, thereby obtaining a positive electrode active material 2 for a lithium secondary battery.

2. Evaluation of Positive Electrode Active Material 2 for Lithium Secondary Battery The composition analysis of the obtained positive electrode active material 2 for a lithium secondary battery was performed and the results were applied to the composition formula (I). As a result, it was found that x=0.05, a=0.60, b=0.20, c=0.20, and d=0.00.

The crystallite sizes $\alpha$ and $\beta$ calculated from peaks A and B of the positive electrode active material 2 for a lithium secondary battery were 493 Å and 406 Å, respectively, and the ratio ($\alpha/\beta$) of the crystallite size $\alpha$ to the crystallite size $\beta$ was 1.21.

The primary particle diameter and the volume-based 50% cumulative particle size $D_{50}$ of the positive electrode active material 2 for a lithium secondary battery were respectively 0.14 μm and 5.0 μm. Further, the volume-based 10% cumulative particle size $D_{10}$ and the volume-based 90% cumulative particle size $D_{90}$ were respectively 3.0 μm and 7.8 μm, and the value of $[D_{90}/D_{10}]$ was 2.6.

The BET specific surface area of the positive electrode active material 2 for a lithium secondary battery was 3.3 m$^2$/g. The tapped bulk density of the positive electrode active material 2 was 1.48 g/cc.

3. Evaluation of Lithium Secondary Battery

A coin-type half cell was produced using the positive electrode active material 2 for a lithium secondary battery, and an initial charge/discharge test was carried out. As a result, the initial charge capacity, the initial discharge capacity and the initial coulombic efficiency were respectively 184 mAh/g, 176 mAh/g and 95.7%.

Example 3

1. Production of Positive Electrode Active Material 3 for Lithium Secondary Battery The nickel-cobalt-manganese composite hydroxide 1 was heated in ambient atmosphere at 250° C. for 5 hours, and the resulting heat-treated product and a lithium carbonate powder were weighed such that Li/(Ni+Co+Mn)=1.12, followed by mixing. The resulting was calcined in ambient atmosphere at 760° C. for 5 hours, thereby obtaining a positive electrode active material 3 for a lithium secondary battery.

2. Evaluation of Positive Electrode Active Material 3 for Lithium Secondary Battery The composition analysis of the obtained positive electrode active material 3 for a lithium secondary battery was performed and the results were applied to the composition formula (I). As a result, it was found that x=0.04, a=0.60, b=0.20, c=0.20, and d=0.00.

The crystallite sizes $\alpha$ and $\beta$ calculated from peaks A and B of the positive electrode active material 3 for a lithium secondary battery were 398 Å and 361 Å, respectively, and the ratio ($\alpha/\beta$) of the crystallite size $\alpha$ to the crystallite size $\beta$ was 1.10.

The primary particle diameter and the volume-based 50% cumulative particle size $D_{50}$ of the positive electrode active material 3 for a lithium secondary battery were respectively 0.14 μm and 4.0 μm. Further, the volume-based 10% cumulative particle size $D_{10}$ and the volume-based 90% cumulative particle size $D_{90}$ were respectively 2.4 μm and 6.5 μm, and the value of $[D_{90}/D_{10}]$ was 2.7.

The BET specific surface area of the positive electrode active material 3 for a lithium secondary battery was 1.1 m$^2$/g. The tapped bulk density of the positive electrode active material 3 was 1.89 g/cc.

3. Evaluation of Lithium Secondary Battery

A coin-type half cell was produced using the positive electrode active material 3 for a lithium secondary battery, and an initial charge/discharge test was carried out. As a result, the initial charge capacity, the initial discharge capacity and the initial coulombic efficiency were respectively 194 mAh/g, 186 mAh/g and 95.9%.

A coin-type full cell was produced using the positive electrode active material 3 for a lithium secondary battery, and a cycle test was carried out. As a result, the discharge capacity at the 1st cycle, the discharge capacity at the 300th cycle and the discharge capacity retention were respectively 149 mAh/g, 125 mAh/g and 83.9%.

Example 4

1. Production of Positive Electrode Active Material 4 for Lithium Secondary Battery A positive electrode active material 4 for a lithium secondary battery was produced following the same procedure as in Example 3, except that the heat-treated product of the nickel-cobalt-manganese composite hydroxide 1 and a lithium carbonate powder were weighed such that Li/(Ni+Co+Mn)=1.09, followed by mixing.

2. Evaluation of Positive Electrode Active Material 4 for Lithium Secondary Battery The composition analysis of the obtained positive electrode active material 4 for a lithium secondary battery was performed and the results were applied to the composition formula (I). As a result, it was found that x=0.05, a=0.60, b=0.20, c=0.20, and d=0.00.

The crystallite sizes α and β calculated from peaks A and B of the positive electrode active material 4 for a lithium secondary battery were 452 Å and 398 Å, respectively, and the ratio (α/β) of the crystallite size α to the crystallite size β was 1.14.

The primary particle diameter and the volume-based 50% cumulative particle size $D_{50}$ of the positive electrode active material 4 for a lithium secondary battery were respectively 0.17 μm and 4.8 μm. Further, the volume-based 10% cumulative particle size $D_{10}$ and the volume-based 90% cumulative particle size $D_{90}$ were respectively 3.0 μm and 7.4 μm, and the value of [$D_{90}/D_{10}$] was 2.5.

The BET specific surface area of the positive electrode active material 4 for a lithium secondary battery was 1.1 $m^2/g$. The tapped bulk density of the positive electrode active material 4 was 1.85 g/cc.

3. Evaluation of Lithium Secondary Battery

A coin-type half cell was produced using the positive electrode active material 4 for a lithium secondary battery, and an initial charge/discharge test was carried out. As a result, the initial charge capacity, the initial discharge capacity and the initial coulombic efficiency were respectively 197 mAh/g, 185 mAh/g and 93.9%.

Example 5

1. Production of Positive Electrode Active Material 5 for Lithium Secondary Battery A positive electrode active material 5 for a lithium secondary battery was produced following the same procedure as in Example 3, except that the heat-treated product of the nickel-cobalt-manganese composite hydroxide 1 and a lithium carbonate powder were weighed such that Li/(Ni+Co+Mn)=1.07, followed by mixing.

2. Evaluation of Positive Electrode Active Material 5 for Lithium Secondary Battery The composition analysis of the obtained positive electrode active material 5 for a lithium secondary battery was performed and the results were applied to the composition formula (I). As a result, it was found that x=0.04, a=0.60, b=0.20, c=0.20, and d=0.00.

The crystallite sizes α and β calculated from peaks A and B of the positive electrode active material 5 for a lithium secondary battery were 443 Å and 378 Å, respectively, and the ratio (α/β) of the crystallite size α to the crystallite size β was 1.17.

The primary particle diameter and the volume-based 50% cumulative particle size $D_{50}$ of the positive electrode active material 5 for a lithium secondary battery were respectively 0.16 μm and 4.5 μm. Further, the volume-based 10% cumulative particle size $D_{10}$ and the volume-based 90% cumulative particle size $D_{90}$ were respectively 2.8 μm and 7.0 μm, and the value of [$D_{90}/D_{10}$] was 2.5.

The BET specific surface area of the positive electrode active material 5 for a lithium secondary battery was 1.0 $m^2/g$. The tapped bulk density of the positive electrode active material 5 was 1.82 g/cc.

3. Evaluation of Lithium Secondary Battery

A coin-type half cell was produced using the positive electrode active material 5 for a lithium secondary battery, and an initial charge/discharge test was carried out. As a result, the initial charge capacity, the initial discharge capacity and the initial coulombic efficiency were respectively 198 mAh/g, 189 mAh/g and 95.5%.

Example 6

1. Production of Positive Electrode Active Material 6 for Lithium Secondary Battery The nickel-cobalt-manganese composite hydroxide 2 was heated in ambient atmosphere at 250° C. for 5 hours, and the resulting heat-treated product and a lithium carbonate powder were weighed such that Li/(Ni+Co+Mn)=1.12, followed by mixing. The resulting was calcined in ambient atmosphere at 760° C. for 5 hours, thereby obtaining a positive electrode active material 6 for a lithium secondary battery.

2. Evaluation of Positive Electrode Active Material 6 for Lithium Secondary Battery The composition analysis of the obtained positive electrode active material 6 for a lithium secondary battery was performed and the results were applied to the composition formula (I). As a result, it was found that x=0.07, a=0.60, b=0.20, c=0.20, and d=0.00.

The crystallite sizes α and β calculated from peaks A and B of the positive electrode active material 6 for a lithium secondary battery were 538 Å and 446 Å, respectively, and the ratio (α/β) of the crystallite size α to the crystallite size β was 1.21.

The primary particle diameter and the volume-based 50% cumulative particle size $D_{50}$ of the positive electrode active material 6 for a lithium secondary battery were respectively 0.17 μm and 5.4 μm. Further, the volume-based 10% cumulative particle size $D_{10}$ and the volume-based 90% cumulative particle size $D_{90}$ were respectively 3.3 μm and 8.7 μm, and the value of [$D_{90}/D_{10}$] was 2.6.

The BET specific surface area of the positive electrode active material 6 for a lithium secondary battery was 1.7 $m^2/g$. The tapped bulk density of the positive electrode active material 6 was 1.78 g/cc.

3. Evaluation of Lithium Secondary Battery

A coin-type half cell was produced using the positive electrode active material 6 for a lithium secondary battery, and an initial charge/discharge test was carried out. As a result, the initial charge capacity, the initial discharge capacity and the initial coulombic efficiency were respectively 192 mAh/g, 182 mAh/g and 94.8%.

Example 7

1. Production of Positive Electrode Active Material 7 for Lithium Secondary Battery A positive electrode active material 7 for a lithium secondary battery was produced following the same procedure as in Example 6, except that the heat-treated product of the nickel-cobalt-manganese composite hydroxide 2 and a lithium carbonate powder were weighed such that Li/(Ni+Co+Mn)=1.09.

2. Evaluation of Positive Electrode Active Material 7 for Lithium Secondary Battery The composition analysis of the obtained positive electrode active material 7 for a lithium secondary battery was performed and the results were applied to the composition formula (I). As a result, it was found that x=0.06, a=0.60, b=0.20, c=0.20, and d=0.00.

The crystallite sizes α and β calculated from peaks A and B of the positive electrode active material 7 for a lithium secondary battery were 512 Å and 424 Å, respectively, and the ratio (α/β) of the crystallite size α to the crystallite size β was 1.21.

The primary particle diameter and the volume-based 50% cumulative particle size $D_{50}$ of the positive electrode active material 7 for a lithium secondary battery were respectively 0.18 μm and 5.0 μm. Further, the volume-based 10% cumulative particle size $D_{10}$ and the volume-based 90% cumulative particle size $D_{90}$ were respectively 3.1 μm and 7.9 μm, and the value of [$D_{90}/D_{10}$] was 2.5.

The BET specific surface area of the positive electrode active material 7 for a lithium secondary battery was 1.8 $m^2/g$. The tapped bulk density of the positive electrode active material 7 was 1.73 g/cc.

3. Evaluation of Lithium Secondary Battery

A coin-type half cell was produced using the positive electrode active material 7 for a lithium secondary battery, and an initial charge/discharge test was carried out. As a result, the initial charge capacity, the initial discharge capacity and the initial coulombic efficiency were respectively 193 mAh/g, 183 mAh/g and 94.8%.

Example 8

1. Production of Positive Electrode Active Material 8 for Lithium Secondary Battery A positive electrode active material 8 for a lithium secondary battery was produced following the same procedure as in Example 6, except that the heat-treated product of the nickel-cobalt-manganese composite hydroxide 2 and a lithium carbonate powder were weighed such that Li/(Ni+Co+Mn)=1.07.

2. Evaluation of Positive Electrode Active Material 8 for Lithium Secondary Battery The composition analysis of the obtained positive electrode active material 8 for a lithium secondary battery was performed and the results were applied to the composition formula (I). As a result, it was found that x=0.05, a=0.60, b=0.20, c=0.20, and d=0.00.

The crystallite sizes α and β calculated from peaks A and B of the positive electrode active material 8 for a lithium secondary battery were 502 Å and 419 Å, respectively, and the ratio (α/β) of the crystallite size α to the crystallite size β was 1.20.

The primary particle diameter and the volume-based 50% cumulative particle size $D_{50}$ of the positive electrode active material 8 for a lithium secondary battery were respectively 0.16 μm and 5.2 μm. Further, the volume-based 10% cumulative particle size $D_{10}$ and the volume-based 90% cumulative particle size $D_{90}$ were respectively 3.2 μm and 8.2 μm, and the value of [$D_{90}/D_{10}$] was 2.6.

The BET specific surface area of the positive electrode active material 8 for a lithium secondary battery was 1.5 $m^2/g$. The tapped bulk density of the positive electrode active material 8 was 1.74 g/cc.

3. Evaluation of Lithium Secondary Battery

A coin-type half cell was produced using the positive electrode active material 8 for a lithium secondary battery, and an initial charge/discharge test was carried out. As a result, the initial charge capacity, the initial discharge capacity and the initial coulombic efficiency were respectively 193 mAh/g, 183 mAh/g and 94.8%.

Example 9

1. Production of Positive Electrode Active Material 9 for Lithium Secondary Battery A positive electrode active material 9 for a lithium secondary battery was produced following the same procedure as in Example 6, except that the heat-treated product of the nickel-cobalt-manganese composite hydroxide 2 and a lithium carbonate powder were weighed such that Li/(Ni+Co+Mn)=1.05.

2. Evaluation of Positive Electrode Active Material 9 for Lithium Secondary Battery The composition analysis of the obtained positive electrode active material 9 for a lithium secondary battery was performed and the results were applied to the composition formula (I). As a result, it was found that x=0.04, a=0.60, b=0.20, c=0.20, and d=0.00.

The crystallite sizes α and β calculated from peaks A and B of the positive electrode active material 9 for a lithium secondary battery were 515 Å and 418 Å, respectively, and the ratio (α/β) of the crystallite size α to the crystallite size β was 1.23.

The primary particle diameter and the volume-based 50% cumulative particle size $D_{50}$ of the positive electrode active material 9 for a lithium secondary battery were respectively 0.14 μm and 5.2 μm. Further, the volume-based 10% cumulative particle size $D_{10}$ and the volume-based 90% cumulative particle size $D_{90}$ were respectively 3.2 μm and 8.2 μm, and the value of [$D_{90}/D_{10}$] was 2.6.

The BET specific surface area of the positive electrode active material 9 for a lithium secondary battery was 1.6 $m^2/g$. The tapped bulk density of the positive electrode active material 9 was 1.70 g/cc.

3. Evaluation of Lithium Secondary Battery

A coin-type half cell was produced using the positive electrode active material 9 for a lithium secondary battery, and an initial charge/discharge test was carried out. As a result, the initial charge capacity, the initial discharge capacity and the initial coulombic efficiency were respectively 194 mAh/g, 184 mAh/g and 94.8%.

Example 10

1. Production of Positive Electrode Active Material 10 for Lithium Secondary Battery A positive electrode active material 10 for a lithium secondary battery was produced following the same procedure as in Example 6, except that the heat-treated product of the nickel-cobalt-manganese composite hydroxide 2 and a lithium carbonate powder were weighed such that Li/(Ni+Co+Mn)=1.03.

2. Evaluation of Positive Electrode Active Material 10 for Lithium Secondary Battery The composition analysis of the obtained positive electrode active material 10 for a lithium secondary battery was performed and the results were applied to the composition formula (I). As a result, it was found that x=0.02, a=0.60, b=0.20, c=0.20, and d=0.00.

The crystallite sizes α and β calculated from peaks A and B of the positive electrode active material 10 for a lithium secondary battery were 487 Å and 400 Å, respectively, and the ratio (α/β) of the crystallite size α to the crystallite size β was 1.22.

The primary particle diameter and the volume-based 50% cumulative particle size $D_{50}$ of the positive electrode active material 10 for a lithium secondary battery were respectively 0.14 μm and 5.2 μm. Further, the volume-based 10% cumulative particle size $D_{10}$ and the volume-based 90% cumulative particle size $D_{90}$ were respectively 3.1 μm and 8.4 μm, and the value of $[D_{90}/D_{10}]$ was 2.7.

The BET specific surface area of the positive electrode active material 10 for a lithium secondary battery was 1.3 m²/g. The tapped bulk density of the positive electrode active material 10 was 1.72 g/cc.

3. Evaluation of Lithium Secondary Battery

A coin-type half cell was produced using the positive electrode active material 10 for a lithium secondary battery, and an initial charge/discharge test was carried out. As a result, the initial charge capacity, the initial discharge capacity and the initial coulombic efficiency were respectively 192 mAh/g, 183 mAh/g and 95.3%.

Example 11

1. Production of Positive Electrode Active Material 11 for Lithium Secondary Battery A positive electrode active material 11 for a lithium secondary battery was produced following the same procedure as in Example 6, except that the calcination temperature was changed to 730° C.

2. Evaluation of Positive Electrode Active Material 11 for Lithium Secondary Battery The composition analysis of the obtained positive electrode active material 11 for a lithium secondary battery was performed and the results were applied to the composition formula (I). As a result, it was found that x=0.06, a=0.60, b=0.20, c=0.20, and d=0.00.

The crystallite sizes α and β calculated from peaks A and B of the positive electrode active material 11 for a lithium secondary battery were 450 Å and 374 Å, respectively, and the ratio (α/β) of the crystallite size α to the crystallite size β was 1.21.

The primary particle diameter and the volume-based 50% cumulative particle size $D_{50}$ of the positive electrode active material 11 for a lithium secondary battery were respectively 0.13 μm and 5.2 μm. Further, the volume-based 10% cumulative particle size $D_{10}$ and the volume-based 90% cumulative particle size $D_{90}$ were respectively 3.2 μm and 8.3 μm, and the value of $[D_{90}/D_{10}]$ was 2.6.

The BET specific surface area of the positive electrode active material 11 for a lithium secondary battery was 2.4 m²/g. The tapped bulk density of the positive electrode active material 11 was 1.66 g/cc.

3. Evaluation of Lithium Secondary Battery

A coin-type half cell was produced using the positive electrode active material 11 for a lithium secondary battery, and an initial charge/discharge test was carried out. As a result, the initial charge capacity, the initial discharge capacity and the initial coulombic efficiency were respectively 190 mAh/g, 181 mAh/g and 95.3%.

Example 12

1. Production of Positive Electrode Active Material 12 for Lithium Secondary Battery A positive electrode active material 12 for a lithium secondary battery was produced following the same procedure as in Example 6, except that the calcination temperature was changed to 700° C.

2. Evaluation of Positive Electrode Active Material 12 for Lithium Secondary Battery The composition analysis of the obtained positive electrode active material 12 for a lithium secondary battery was performed and the results were applied to the composition formula (I). As a result, it was found that x=0.07, a=0.60, b=0.20, c=0.20, and d=0.00.

The crystallite sizes α and β calculated from peaks A and B of the positive electrode active material 12 for a lithium secondary battery were 360 Å and 312 Å, respectively, and the ratio (α/β) of the crystallite size α to the crystallite size β was 1.15.

The primary particle diameter and the volume-based 50% cumulative particle size $D_{50}$ of the positive electrode active material 12 for a lithium secondary battery were respectively 0.13 μm and 4.5 μm. Further, the volume-based 10% cumulative particle size $D_{10}$ and the volume-based 90% cumulative particle size $D_{90}$ were respectively 2.8 μm and 7.1 μm, and the value of $[D_{90}/D_{10}]$ was 2.5.

The BET specific surface area of the positive electrode active material 12 for a lithium secondary battery was 3.5 m²/g. The tapped bulk density of the positive electrode active material 12 was 1.54 g/cc.

3. Evaluation of Lithium Secondary Battery

A coin-type half cell was produced using the positive electrode active material 12 for a lithium secondary battery, and an initial charge/discharge test was carried out. As a result, the initial charge capacity, the initial discharge capacity and the initial coulombic efficiency were respectively 187 mAh/g, 180 mAh/g and 96.3%.

Example 13

1. Production of Positive Electrode Active Material 13 for Lithium Secondary Battery A positive electrode active material 13 for a lithium secondary battery was produced following the same procedure as in Example 6, except that the calcination time was changed to 3 hours.

2. Evaluation of Positive Electrode Active Material 13 for Lithium Secondary Battery The composition analysis of the obtained positive electrode active material 13 for a lithium secondary battery was performed and the results were applied to the composition formula (I). As a result, it was found that x=0.06, a=0.60, b=0.20, c=0.20, and d=0.00.

The crystallite sizes α and β calculated from peaks A and B of the positive electrode active material 13 for a lithium secondary battery were 418 Å and 373 Å, respectively, and the ratio (α/β) of the crystallite size α to the crystallite size β was 1.12.

The primary particle diameter and the volume-based 50% cumulative particle size $D_{50}$ of the positive electrode active material 13 for a lithium secondary battery were respectively 0.13 μm and 4.9 μm. Further, the volume-based 10% cumulative particle size $D_{10}$ and the volume-based 90% cumulative particle size $D_{90}$ were respectively 3.0 μm and 7.8 μm, and the value of $[D_{90}/D_{10}]$ was 2.6.

The BET specific surface area of the positive electrode active material 13 for a lithium secondary battery was 2.0 m²/g. The tapped bulk density of the positive electrode active material 13 was 1.75 g/cc.

3. Evaluation of Lithium Secondary Battery

A coin-type half cell was produced using the positive electrode active material 13 for a lithium secondary battery, and an initial charge/discharge test was carried out. As a result, the initial charge capacity, the initial discharge capacity and the initial coulombic efficiency were respectively 192 mAh/g, 182 mAh/g and 94.8%.

Example 14

1. Production of Positive Electrode Active Material 14 for Lithium Secondary Battery A positive electrode active material 14 for a lithium secondary battery was produced following the same procedure as in Example 6, except that the calcination time was changed to 7 hours.

2. Evaluation of Positive Electrode Active Material 14 for Lithium Secondary Battery The composition analysis of the obtained positive electrode active material 14 for a lithium secondary battery was performed and the results were applied to the composition formula (I). As a result, it was found that x=0.05, a=0.60, b=0.20, c=0.20, and d=0.00.

The crystallite sizes α and β calculated from peaks A and B of the positive electrode active material 14 for a lithium secondary battery were 482 Å and 403 Å, respectively, and the ratio (α/β) of the crystallite size α to the crystallite size β was 1.20.

The primary particle diameter and the volume-based 50% cumulative particle size $D_{50}$ of the positive electrode active material 14 for a lithium secondary battery were respectively 0.17 μm and 4.7 μm. Further, the volume-based 10% cumulative particle size $D_{10}$ and the volume-based 90% cumulative particle size $D_{90}$ were respectively 2.9 μm and 7.3 μm, and the value of $[D_{90}/D_{10}]$ was 2.5.

The BET specific surface area of the positive electrode active material 14 for a lithium secondary battery was 1.1 m²/g. The tapped bulk density of the positive electrode active material 14 was 1.84 g/cc.

3. Evaluation of Lithium Secondary Battery

A coin-type half cell was produced using the positive electrode active material 14 for a lithium secondary battery, and an initial charge/discharge test was carried out. As a result, the initial charge capacity, the initial discharge capacity and the initial coulombic efficiency were respectively 195 mAh/g, 184 mAh/g and 94.4%.

Example 15

1. Production of Positive Electrode Active Material 15 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.58:0.17:0.25, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.4, thereby obtaining nickel-cobalt-manganese composite hydroxide particles. The obtained particles were washed with water after filtration, and dried at 100° C., to thereby obtain a nickel-cobalt-manganese composite hydroxide 3. The BET specific surface area of the nickel-cobalt-manganese composite hydroxide 3 was 38.7 m²/g.

The thus obtained nickel-cobalt-manganese composite hydroxide 3 and a lithium carbonate powder were weighed such that Li/(Ni+Co+Mn)=1.12, followed by mixing. The resulting was calcined in ambient atmosphere at 760° C. for 5 hours, thereby obtaining an intended positive electrode active material 15 for a lithium secondary battery.

2. Evaluation of Positive Electrode Active Material 15 for Lithium Secondary Battery The composition analysis of the obtained positive electrode active material 15 for a lithium secondary battery was performed and the results were applied to the composition formula (I). As a result, it was found that x=0.05, a=0.58, b=0.17, c=0.25, and d=0.00.

The crystallite sizes α and β calculated from peaks A and B of the positive electrode active material 15 for a lithium secondary battery were 326 Å and 286 Å, respectively, and the ratio (α/β) of the crystallite size α to the crystallite size β was 1.14.

The primary particle diameter and the volume-based 50% cumulative particle size $D_{50}$ of the positive electrode active material 15 for a lithium secondary battery were respectively 0.12 μm and 4.8 μm. Further, the volume-based 10% cumulative particle size $D_{10}$ and the volume-based 90% cumulative particle size $D_{90}$ were respectively 3.1 μm and 7.1 μm, and the value of $[D_{90}/D_{10}]$ was 2.3.

The BET specific surface area of the positive electrode active material 15 for a lithium secondary battery was 2.8 m²/g. The tapped bulk density of the positive electrode active material 15 was 1.59 g/cc.

3. Evaluation of Lithium Secondary Battery

A coin-type half cell was produced using the positive electrode active material 15 for a lithium secondary battery, and an initial charge/discharge test was carried out. As a result, the initial charge capacity, the initial discharge capacity and the initial coulombic efficiency were respectively 188 mAh/g, 180 mAh/g and 95.7%.

Comparative Example 1

A nickel-cobalt-manganese composite hydroxide 4 was produced following the same procedure as in Example 1 except that the pH of the solution in the reaction vessel was adjusted to 12.2.

The BET specific surface area of the nickel-cobalt-manganese composite hydroxide 4 was 10.3 m²/g.

The thus obtained nickel-cobalt-manganese composite hydroxide 4 and a lithium carbonate powder were weighed such that Li/(Ni+Co+Mn)=1.12, followed by mixing. The resulting was calcined in ambient atmosphere at 760° C. for 5 hours, followed by further calcination in ambient atmosphere at 850° C. for 10 hours, thereby obtaining a positive electrode active material 16 for a lithium secondary battery.

1. Evaluation of Positive Electrode Active Material 16 for Lithium Secondary Battery The composition analysis of the obtained positive electrode active material 16 for a lithium secondary battery was performed and the results were applied to the composition formula (I). As a result, it was found that x=0.02, a=0.60, b=0.20, c=0.20, and d=0.00.

The crystallite sizes α and β calculated from peaks A and B of the positive electrode active material 16 for a lithium secondary battery were 1,220 Å and 631 Å, respectively, and the ratio (α/β) of the crystallite size α to the crystallite size β was 1.93.

The primary particle diameter and the volume-based 50% cumulative particle size $D_{50}$ of the positive electrode active material 16 for a lithium secondary battery were respectively 0.42 μm and 6.0 μm. Further, the volume-based 10% cumulative particle size $D_{10}$ and the volume-based 90% cumulative particle size $D_{90}$ were respectively 3.0 μm and 11.1 μm, and the value of $[D_{90}/D_{10}]$ was 3.7.

The BET specific surface area of the positive electrode active material 16 for a lithium secondary battery was 0.7 m²/g. The tapped bulk density of the positive electrode active material 16 was 1.65 g/cc.

2. Evaluation of Lithium Secondary Battery

A coin-type half cell was produced using the positive electrode active material 16 for a lithium secondary battery, and an initial charge/discharge test was carried out. As a result, the initial charge capacity, the initial discharge capacity and the initial coulombic efficiency were respectively 201 mAh/g, 174 mAh/g and 86.6%.

Comparative Example 2

The nickel-cobalt-manganese composite hydroxide 4 and a lithium carbonate powder were weighed such that Li/(Ni+Co+Mn)=1.12, followed by mixing. The resulting was calcined in ambient atmosphere at 760° C. for 5 hours, followed by further calcination in oxygen atmosphere at 850° C. for 10 hours, thereby obtaining a positive electrode active material 17 for a lithium secondary battery.

1. Evaluation of Positive Electrode Active Material 17 for Lithium Secondary Battery The composition analysis of the obtained positive electrode active material 17 for a lithium secondary battery was performed and the results were applied to the composition formula (I). As a result, it was found that x=0.01, a=0.60, b=0.20, c=0.20, and d=0.00.

The crystallite sizes α and β calculated from peaks A and B of the positive electrode active material 17 for a lithium secondary battery were 920 Å and 507 Å, respectively, and the ratio (α/β) of the crystallite size α to the crystallite size β was 1.81.

The primary particle diameter and the volume-based 50% cumulative particle size $D_{50}$ of the positive electrode active material 17 for a lithium secondary battery were respectively 0.28 μm and 6.8 μm. Further, the volume-based 10% cumulative particle size $D_{10}$ and the volume-based 90% cumulative particle size $D_{90}$ were respectively 3.2 μm and 12.4 μm, and the value of $[D_{90}/D_{10}]$ was 3.9.

The BET specific surface area of the positive electrode active material 17 for a lithium secondary battery was 0.7 m²/g. The tapped bulk density of the positive electrode active material 17 was 1.61 g/cc.

2. Evaluation of Lithium Secondary Battery

A coin-type half cell was produced using the positive electrode active material 17 for a lithium secondary battery, and an initial charge/discharge test was carried out. As a result, the initial charge capacity, the initial discharge capacity and the initial coulombic efficiency were respectively 200 mAh/g, 174 mAh/g and 87.0%.

Comparative Example 3

The nickel-cobalt-manganese composite hydroxide 1 and a lithium carbonate powder were weighed such that Li/(Ni+Co+Mn)=1.12, followed by mixing. The resulting was calcined in ambient atmosphere at 760° C. for 5 hours, followed by further calcination in ambient atmosphere at 850° C. for 10 hours, thereby obtaining a positive electrode active material 18 for a lithium secondary battery.

1. Evaluation of Positive Electrode Active Material 18 for Lithium Secondary Battery The composition analysis of the obtained positive electrode active material 18 for a lithium secondary battery was performed and the results were applied to the composition formula (I). As a result, it was found that x=0.02, a=0.60, b=0.20, c=0.20, and d=0.00.

The crystallite sizes α and β calculated from peaks A and B of the positive electrode active material 18 for a lithium secondary battery were 1,202 Å and 668 Å, respectively, and the ratio (α/β) of the crystallite size α to the crystallite size β was 1.80.

The primary particle diameter and the volume-based 50% cumulative particle size $D_{50}$ of the positive electrode active material 18 for a lithium secondary battery were respectively 0.42 μm and 5.5 μm. Further, the volume-based 10% cumulative particle size $D_{10}$ and the volume-based 90% cumulative particle size $D_{90}$ were respectively 2.4 μm and 13.2 μm, and the value of $[D_{90}/D_{10}]$ was 5.5.

The BET specific surface area of the positive electrode active material 18 for a lithium secondary battery was 1.0 m²/g. The tapped bulk density of the positive electrode active material 18 was 1.58 g/cc.

2. Evaluation of Lithium Secondary Battery

A coin-type half cell was produced using the positive electrode active material 18 for a lithium secondary battery, and an initial charge/discharge test was carried out. As a result, the initial charge capacity, the initial discharge capacity and the initial coulombic efficiency were respectively 197 mAh/g, 179 mAh/g and 90.9%.

A coin-type full cell was produced using the positive electrode active material 18 for a lithium secondary battery, and a cycle test was carried out. As a result, the discharge capacity at the 1st cycle, the discharge capacity at the 300th cycle and the discharge capacity retention were respectively 150 mAh/g, 121 mAh/g and 80.6%.

Comparative Example 4

The nickel-cobalt-manganese composite hydroxide 1 and a lithium carbonate powder were weighed such that Li/(Ni+Co+Mn)=1.12, followed by mixing. The resulting was calcined in ambient atmosphere at 760° C. for 5 hours, followed by further calcination in oxygen atmosphere at 850° C. for 10 hours, thereby obtaining a positive electrode active material 19 for a lithium secondary battery.

1. Evaluation of Positive Electrode Active Material 19 for Lithium Secondary Battery The composition analysis of the obtained positive electrode active material 19 for a lithium secondary battery was performed and the results were applied to the composition formula (I). As a result, it was found that x=0.02, a=0.60, b=0.20, c=0.20, and d=0.00.

The crystallite sizes α and β calculated from peaks A and B of the positive electrode active material 19 for a lithium secondary battery were 1,074 Å and 569 Å, respectively, and the ratio (α/β) of the crystallite size α to the crystallite size β was 1.89.

The primary particle diameter and the volume-based 50% cumulative particle size $D_{50}$ of the positive electrode active material 19 for a lithium secondary battery were respectively 0.32 μm and 5.2 μm. Further, the volume-based 10% cumulative particle size $D_{10}$ and the volume-based 90% cumulative particle size $D_{90}$ were respectively 2.4 μm and 8.4 μm, and the value of $[D_{90}/D_{10}]$ was 3.5.

The BET specific surface area of the positive electrode active material 19 for a lithium secondary battery was 0.8 $m^2/g$. The tapped bulk density of the positive electrode active material 19 was 1.59 g/cc.

2. Evaluation of Lithium Secondary Battery

A coin-type half cell was produced using the positive electrode active material 19 for a lithium secondary battery, and an initial charge/discharge test was carried out. As a result, the initial charge capacity, the initial discharge capacity and the initial coulombic efficiency were respectively 196 mAh/g, 178 mAh/g and 90.8%.

Comparative Example 5

The nickel-cobalt-manganese composite hydroxide 4 and a lithium carbonate powder were weighed such that Li/(Ni+Co+Mn)=1.12, followed by mixing. The resulting was calcined in ambient atmosphere at 850° C. for 10 hours, thereby obtaining a positive electrode active material 20 for a lithium secondary battery.

1. Evaluation of Positive Electrode Active Material 20 for Lithium Secondary Battery The composition analysis of the obtained positive electrode active material 20 for a lithium secondary battery was performed and the results were applied to the composition formula (I). As a result, it was found that x=0.04, a=0.60, b=0.20, c=0.20, and d=0.00.

The crystallite sizes α and β calculated from peaks A and B of the positive electrode active material 20 for a lithium secondary battery were 1,365 Å and 693 Å, respectively, and the ratio (α/β) of the crystallite size α to the crystallite size β was 1.97.

The primary particle diameter and the volume-based 50% cumulative particle size $D_{50}$ of the positive electrode active material 20 for a lithium secondary battery were respectively 0.35 μm and 11.9 μm. Further, the volume-based 10% cumulative particle size $D_{10}$ and the volume-based 90% cumulative particle size $D_{90}$ were respectively 4.7 μm and 31.4 μm, and the value of $[D_{90}/D_{10}]$ was 6.7.

The BET specific surface area of the positive electrode active material 20 for a lithium secondary battery was 0.6 $m^2/g$. The tapped bulk density of the positive electrode active material 20 was 1.49 g/cc.

2. Evaluation of Lithium Secondary Battery

A coin-type half cell was produced using the positive electrode active material 20 for a lithium secondary battery, and an initial charge/discharge test was carried out. As a result, the initial charge capacity, the initial discharge capacity and the initial coulombic efficiency were respectively 196 mAh/g, 175 mAh/g and 89.3%.

Comparative Example 6

A positive electrode active material 21 for a lithium secondary battery was produced following the same procedure as in Comparative Example 5, except that the calcination temperature was changed to 900° C.

1. Evaluation of Positive Electrode Active Material 21 for Lithium Secondary Battery The composition analysis of the obtained positive electrode active material 21 for a lithium secondary battery was performed and the results were applied to the composition formula (I). As a result, it was found that x=0.02, a=0.60, b=0.20, c=0.20, and d=0.00.

The crystallite sizes α and β calculated from peaks A and B of the positive electrode active material 21 for a lithium secondary battery were 1,872 Å and 987 Å, respectively, and the ratio (α/β) of the crystallite size α to the crystallite size β was 1.90.

The primary particle diameter and the volume-based 50% cumulative particle size $D_{50}$ of the positive electrode active material 21 for a lithium secondary battery were respectively 1.51 μm and 11.4 μm. Further, the volume-based 10% cumulative particle size $D_{10}$ and the volume-based 90% cumulative particle size $D_{90}$ were respectively 3.0 μm and 33.3 μm, and the value of $[D_{90}/D_{10}]$ was 11.1.

The BET specific surface area of the positive electrode active material 21 for a lithium secondary battery was 0.4 $m^2/g$. The tapped bulk density of the positive electrode active material 21 was 1.33 g/cc.

2. Evaluation of Lithium Secondary Battery

A coin-type half cell was produced using the positive electrode active material 21 for a lithium secondary battery, and an initial charge/discharge test was carried out. As a result, the initial charge capacity, the initial discharge capacity and the initial coulombic efficiency were respectively 198 mAh/g, 173 mAh/g and 89.3%.

Example 16

1. Production of Positive Electrode Active Material 22 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.58:0.17:0.25, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.8, thereby obtaining nickel-cobalt-manganese composite hydroxide particles. The obtained particles were washed with water after filtration, and dried at 100° C., to thereby obtain a nickel-cobalt-manganese composite hydroxide 5. The BET specific surface area of the nickel-cobalt-manganese composite hydroxide 5 was 91.7 $m^2/g$.

The thus obtained nickel-cobalt-manganese composite hydroxide 5 and a lithium carbonate powder were weighed such that Li/(Ni+Co+Mn)=1.12, followed by mixing. The resulting was calcined in ambient atmosphere at 760° C. for 5 hours, followed by further calcination in ambient atmosphere at 850° C. for 10 hours, thereby obtaining a positive electrode active material 22 for a lithium secondary battery.

2. Evaluation of Positive Electrode Active Material 22 for Lithium Secondary Battery The composition analysis of the obtained positive electrode active material 22 for a lithium secondary battery was performed and the results were applied to the composition formula (I). As a result, it was found that x=0.05, a=0.58, b=0.17, c=0.25, and d=0.00.

The crystallite sizes α and β calculated from peaks A and B of the positive electrode active material 22 for a lithium secondary battery were 830 Å and 514 Å, respectively, and the ratio (α/β) of the crystallite size α to the crystallite size β was 1.61.

The primary particle diameter and the volume-based 50% cumulative particle size $D_{50}$ of the positive electrode active material 22 for a lithium secondary battery were respectively 0.22 μm and 5.6 μm. Further, the volume-based 10% cumulative particle size $D_{10}$ and the volume-based 90% cumulative particle size $D_{90}$ were respectively 3.6 μm and 8.7 μm, and the value of $[D_{90}/D_{10}]$ was 2.4.

The BET specific surface area of the positive electrode active material 22 for a lithium secondary battery was 1.1 m²/g. The tapped bulk density of the positive electrode active material 22 was 1.42 g/cc.

3. Evaluation of Lithium Secondary Battery

A coin-type half cell was produced using the positive electrode active material 22 for a lithium secondary battery, and an initial charge/discharge test was carried out. As a result, the initial charge capacity, the initial discharge capacity and the initial coulombic efficiency were respectively 195 mAh/g, 182 mAh/g and 93.3%.

Example 17

1. Production of Positive Electrode Active Material 23 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.7, thereby obtaining nickel-cobalt-manganese composite hydroxide particles. The obtained particles were washed with water after filtration, and dried at 100° C., to thereby obtain a nickel-cobalt-manganese composite hydroxide 6. The BET specific surface area of the nickel-cobalt-manganese composite hydroxide 6 was 76.2 m²/g.

The thus obtained nickel-cobalt-manganese composite hydroxide 6 and a lithium carbonate powder were weighed such that Li/(Ni+Co+Mn)=1.09, followed by mixing. The resulting was calcined in ambient atmosphere at 760° C. for 5 hours, followed by further calcination in ambient atmosphere at 850° C. for 2 hours, thereby obtaining a positive electrode active material 23 for a lithium secondary battery.

2. Evaluation of Positive Electrode Active Material 23 for Lithium Secondary Battery The composition analysis of the obtained positive electrode active material 23 for a lithium secondary battery was performed and the results were applied to the composition formula (I). As a result, it was found that x=0.04, a=0.55, b=0.21, c=0.24, and d=0.00.

The crystallite sizes α and β calculated from peaks A and B of the positive electrode active material 23 for a lithium secondary battery were 719 Å and 467 Å, respectively, and the ratio (α/β) of the crystallite size α to the crystallite size β was 1.54.

The primary particle diameter and the volume-based 50% cumulative particle size $D_{50}$ of the positive electrode active material 23 for a lithium secondary battery were respectively 0.24 μm and 3.6 μm. Further, the volume-based 10% cumulative particle size $D_{10}$ and the volume-based 90% cumulative particle size $D_{90}$ were respectively 1.9 μm and 5.3 μm, and the value of $[D_{90}/D_{10}]$ was 2.8.

The BET specific surface area of the positive electrode active material 23 for a lithium secondary battery was 2.3 m²/g. The tapped bulk density of the positive electrode active material 23 was 1.44 g/cc.

3. Evaluation of Lithium Secondary Battery

A coin-type half cell was produced using the positive electrode active material 23 for a lithium secondary battery, and an initial charge/discharge test was carried out. As a result, the initial charge capacity, the initial discharge capacity and the initial coulombic efficiency were respectively 191 mAh/g, 184 mAh/g and 96.3%.

A coin-type full cell was produced using the positive electrode active material 23 for a lithium secondary battery, and a cycle test was carried out. As a result, the discharge capacity at the 1st cycle, the discharge capacity at the 300th cycle and the discharge capacity retention were respectively 150 mAh/g, 129 mAh/g and 86.0%.

Example 18

1. Production of Positive Electrode Active Material 24 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.5, thereby obtaining nickel-cobalt-manganese composite hydroxide particles. The obtained particles were washed with water after filtration, and dried at 100° C., to thereby obtain a nickel-cobalt-manganese composite hydroxide 7. The BET specific surface area of the nickel-cobalt-manganese composite hydroxide 7 was 53.9 m²/g.

The thus obtained nickel-cobalt-manganese composite hydroxide 7 and a lithium carbonate powder were weighed such that Li/(Ni+Co+Mn)=1.07, followed by mixing. The resulting was calcined in ambient atmosphere at 760° C. for 5 hours, followed by further calcination in ambient atmosphere at 850° C. for 10 hours, thereby obtaining a positive electrode active material 24 for a lithium secondary battery.

2. Evaluation of Positive Electrode Active Material 24 for Lithium Secondary Battery The composition analysis of the obtained positive electrode active material 24 for a lithium secondary battery was performed and the results were applied to the composition formula (I). As a result, it was found that x=0.03, a=0.55, b=0.21, c=0.24, and d=0.00.

The crystallite sizes α and β calculated from peaks A and B of the positive electrode active material 24 for a lithium secondary battery were 774 Å and 491 Å, respectively, and the ratio (α/β) of the crystallite size α to the crystallite size β was 1.58.

The primary particle diameter and the volume-based 50% cumulative particle size $D_{50}$ of the positive electrode active material 24 for a lithium secondary battery were respectively 0.20 μm and 4.1 μm. Further, the volume-based 10% cumulative particle size $D_{10}$ and the volume-based 90% cumulative particle size $D_{90}$ were respectively 2.6 μm and 6.2 μm, and the value of $[D_{90}/D_{10}]$ was 2.4.

The BET specific surface area of the positive electrode active material 24 for a lithium secondary battery was 1.8 m²/g. The tapped bulk density of the positive electrode active material 24 was 1.54 g/cc.

3. Evaluation of Lithium Secondary Battery

A coin-type half cell was produced using the positive electrode active material 24 for a lithium secondary battery, and an initial charge/discharge test was carried out. As a result, the initial charge capacity, the initial discharge capacity and the initial coulombic efficiency were respectively 192 mAh/g, 179 mAh/g and 93.2%.

A coin-type full cell was produced using the positive electrode active material 24 for a lithium secondary battery, and a cycle test was carried out. As a result, the discharge capacity at the 1st cycle, the discharge capacity at the 300th cycle and the discharge capacity retention were respectively 148 mAh/g, 127 mAh/g and 85.8%.

Example 19

1. Production of Positive Electrode Active Material 25 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.7, thereby obtaining nickel-cobalt-manganese composite hydroxide particles. The obtained particles were washed with water after filtration, and dried at 100° C., to thereby obtain a nickel-cobalt-manganese composite hydroxide 8. The BET specific surface area of the nickel-cobalt-manganese composite hydroxide 8 was 82.5 m²/g.

The thus obtained nickel-cobalt-manganese composite hydroxide 8 and a lithium carbonate powder were weighed such that Li/(Ni+Co+Mn)=1.03, followed by mixing. The resulting was calcined in ambient atmosphere at 760° C. for 5 hours, followed by further calcination in ambient atmosphere at 850° C. for 10 hours, thereby obtaining a positive electrode active material 25 for a lithium secondary battery.

2. Evaluation of Positive Electrode Active Material 25 for Lithium Secondary Battery The composition analysis of the obtained positive electrode active material 25 for a lithium secondary battery was performed and the results were applied to the composition formula (I). As a result, it was found that x=0.01, a=0.55, b=0.21, c=0.24, and d=0.00.

The crystallite sizes α and β calculated from peaks A and B of the positive electrode active material 25 for a lithium secondary battery were 719 Å and 479 Å, respectively, and the ratio (α/β) of the crystallite size α to the crystallite size β was 1.50.

The primary particle diameter and the volume-based 50% cumulative particle size $D_{50}$ of the positive electrode active material 25 for a lithium secondary battery were respectively 0.18 μm and 3.7 μm. Further, the volume-based 10% cumulative particle size $D_{10}$ and the volume-based 90% cumulative particle size $D_{90}$ were respectively 2.2 μm and 5.8 μm, and the value of $[D_{90}/D_{10}]$ was 2.6.

The BET specific surface area of the positive electrode active material 25 for a lithium secondary battery was 3.5 m²/g. The tapped bulk density of the positive electrode active material 25 was 1.22 g/cc.

3. Evaluation of Lithium Secondary Battery

A coin-type half cell was produced using the positive electrode active material 25 for a lithium secondary battery, and an initial charge/discharge test was carried out. As a result, the initial charge capacity, the initial discharge capacity and the initial coulombic efficiency were respectively 192 mAh/g, 182 mAh/g and 94.8%.

Example 20

A positive electrode active material 26 for a lithium secondary battery was produced following the same procedure as in Example 19, except that the nickel-cobalt-manganese composite hydroxide 8 and a lithium carbonate powder were weighed such that Li/(Ni+Co+Mn)=1.12, followed by mixing.

2. Evaluation of Positive Electrode Active Material 26 for Lithium Secondary Battery The composition analysis of the obtained positive electrode active material 26 for a lithium secondary battery was performed and the results were applied to the composition formula (I). As a result, it was found that x=0.05, a=0.55, b=0.21, c=0.24, and d=0.00.

The crystallite sizes α and β calculated from peaks A and B of the positive electrode active material 26 for a lithium secondary battery were 830 Å and 496 Å, respectively, and the ratio (α/β) of the crystallite size α to the crystallite size β was 1.67.

The primary particle diameter and the volume-based 50% cumulative particle size $D_{50}$ of the positive electrode active material 26 for a lithium secondary battery were respectively 0.21 μm and 4.2 μm. Further, the volume-based 10% cumulative particle size $D_{10}$ and the volume-based 90% cumulative particle size $D_{90}$ were respectively 2.6 μm and 6.6 μm, and the value of $[D_{90}/D_{10}]$ was 2.5.

The BET specific surface area of the positive electrode active material 26 for a lithium secondary battery was 1.8 m²/g. The tapped bulk density of the positive electrode active material 26 was 1.34 g/cc.

3. Evaluation of Lithium Secondary Battery

A coin-type half cell was produced using the positive electrode active material 26 for a lithium secondary battery, and an initial charge/discharge test was carried out. As a result, the initial charge capacity, the initial discharge capacity and the initial coulombic efficiency were respectively 190 mAh/g, 179 mAh/g and 94.2%.

A coin-type full cell was produced using the positive electrode active material 26 for a lithium secondary battery, and a cycle test was carried out. As a result, the discharge capacity at the 1st cycle, the discharge capacity at the 300th cycle and the discharge capacity retention were respectively 147 mAh/g, 126 mAh/g and 85.7%.

The results of the Examples and Comparative Examples are summarized in Tables 1 to 5.

TABLE 3

|  | Initial charge capacity (mAh/g) | Initial discharge capacity (mAh/g) | Initial coulombic efficiency (%) |
|---|---|---|---|
| Ex. 1 | 183 | 176 | 96.2 |
| Ex. 2 | 184 | 176 | 95.7 |
| Ex. 3 | 194 | 186 | 95.9 |
| Ex. 4 | 197 | 185 | 93.9 |
| Ex. 5 | 198 | 189 | 95.5 |
| Ex. 6 | 192 | 182 | 94.8 |
| Ex. 7 | 193 | 183 | 94.8 |
| Ex. 8 | 193 | 183 | 94.8 |
| Ex. 9 | 194 | 184 | 94.8 |
| Ex. 10 | 192 | 183 | 95.3 |
| Ex. 11 | 190 | 181 | 95.3 |

TABLE 1

|  | Crystallite size α (Å) | Crystallite size β (Å) | α/β | Average primary particle diameter (μm) | $D_{50}$ (μm) | $D_{10}$ (μm) | $D_{90}$ (μm) | $D_{90}/D_{10}$ | BET specific surface area (m²/g) | Tapped bulk density (g/cc) |
|---|---|---|---|---|---|---|---|---|---|---|
| Ex. 1 | 407 | 309 | 1.04 | 0.15 | 4.8 | 2.6 | 7.4 | 2.8 | 3.2 | 1.52 |
| Ex. 2 | 493 | 406 | 1.21 | 0.14 | 5.0 | 3.0 | 7.8 | 2.6 | 3.3 | 1.48 |
| Ex. 3 | 398 | 361 | 1.10 | 0.14 | 4.0 | 2.4 | 6.5 | 2.7 | 1.1 | 1.89 |
| Ex. 4 | 452 | 398 | 1.14 | 0.17 | 4.8 | 3.0 | 7.4 | 2.5 | 1.1 | 1.85 |
| Ex. 5 | 443 | 378 | 1.17 | 0.16 | 4.5 | 2.8 | 7.0 | 2.5 | 1.0 | 1.82 |
| Ex. 6 | 538 | 446 | 1.21 | 0.17 | 5.4 | 3.3 | 8.7 | 2.6 | 1.7 | 1.78 |
| Ex. 7 | 512 | 424 | 1.21 | 0.18 | 5.0 | 3.1 | 7.9 | 2.5 | 1.8 | 1.73 |
| Ex. 8 | 502 | 419 | 1.20 | 0.16 | 5.2 | 3.2 | 8.2 | 2.6 | 1.5 | 1.74 |
| Ex. 9 | 515 | 418 | 1.23 | 0.14 | 5.2 | 3.2 | 8.2 | 2.6 | 1.6 | 1.70 |
| Ex. 10 | 487 | 400 | 1.22 | 0.14 | 5.2 | 3.1 | 8.4 | 2.7 | 1.3 | 1.72 |
| Ex. 11 | 450 | 374 | 1.21 | 0.13 | 5.2 | 3.2 | 8.3 | 2.6 | 2.4 | 1.66 |
| Ex. 12 | 360 | 312 | 1.15 | 0.13 | 4.5 | 2.8 | 7.1 | 2.5 | 3.5 | 1.54 |
| Ex. 13 | 418 | 373 | 1.12 | 0.13 | 4.9 | 3.0 | 7.8 | 2.6 | 2.0 | 1.75 |
| Ex. 14 | 482 | 403 | 1.20 | 0.17 | 4.7 | 2.9 | 7.3 | 2.5 | 1.1 | 1.84 |
| Ex. 15 | 326 | 286 | 1.14 | 0.12 | 4.8 | 3.1 | 7.1 | 2.3 | 2.8 | 1.59 |
| Ex. 16 | 830 | 514 | 1.61 | 0.22 | 5.6 | 3.6 | 8.7 | 2.4 | 1.1 | 1.42 |
| Ex. 17 | 719 | 467 | 1.54 | 0.24 | 3.6 | 1.9 | 5.3 | 2.8 | 2.3 | 1.44 |
| Ex. 18 | 774 | 491 | 1.58 | 0.20 | 4.1 | 2.6 | 6.2 | 2.4 | 1.8 | 1.54 |
| Ex. 19 | 719 | 479 | 1.50 | 0.18 | 3.7 | 2.2 | 5.8 | 2.6 | 3.5 | 1.22 |
| Ex. 20 | 830 | 496 | 1.67 | 0.21 | 4.2 | 2.6 | 6.6 | 2.5 | 1.8 | 1.34 |

TABLE 2

|  | Crystallite size α (Å) | Crystallite size β (Å) | α/β | Average primary particle diameter (μm) | $D_{50}$ (μm) | $D_{10}$ (μm) | $D_{90}$ (μm) | $D_{90}/D_{10}$ | BET specific surface area (m²/g) | Tapped bulk density (g/cc) |
|---|---|---|---|---|---|---|---|---|---|---|
| Comp. Ex. 1 | 1220 | 631 | 1.93 | 0.42 | 6.0 | 3.0 | 11.1 | 3.7 | 0.7 | 1.65 |
| Comp. Ex. 2 | 920 | 507 | 1.81 | 0.28 | 6.8 | 3.2 | 12.4 | 3.9 | 0.7 | 1.61 |
| Comp. Ex. 3 | 1202 | 668 | 1.80 | 0.42 | 5.5 | 2.4 | 13.2 | 5.5 | 1.0 | 1.58 |
| Comp. Ex. 4 | 1074 | 569 | 1.89 | 0.32 | 5.2 | 2.4 | 8.4 | 3.5 | 0.8 | 1.59 |
| Comp. Ex. 5 | 1365 | 693 | 1.97 | 0.35 | 11.9 | 4.7 | 31.4 | 6.7 | 0.6 | 1.49 |
| Comp. Ex. 6 | 1872 | 987 | 1.90 | 1.51 | 11.4 | 3.0 | 33.3 | 11.1 | 0.4 | 1.33 |

TABLE 3-continued

| | Initial charge capacity (mAh/g) | Initial discharge capacity (mAh/g) | Initial coulombic efficiency (%) |
|---|---|---|---|
| Ex. 12 | 187 | 180 | 96.3 |
| Ex. 13 | 192 | 182 | 94.8 |
| Ex. 14 | 195 | 184 | 94.4 |
| Ex. 15 | 188 | 180 | 95.7 |
| Ex. 16 | 195 | 182 | 93.3 |
| Ex. 17 | 191 | 184 | 96.3 |
| Ex. 18 | 192 | 179 | 93.2 |
| Ex. 19 | 192 | 182 | 94.8 |
| Ex. 20 | 190 | 179 | 94.2 |

TABLE 4

| | Initial charge capacity (mAh/g) | Initial discharge capacity (mAh/g) | Initial coulombic efficiency (%) |
|---|---|---|---|
| Comp. Ex. 1 | 201 | 174 | 86.6 |
| Comp. Ex. 2 | 200 | 174 | 87.0 |
| Comp. Ex. 3 | 197 | 179 | 90.9 |
| Comp. Ex. 4 | 196 | 178 | 90.8 |
| Comp. Ex. 5 | 196 | 175 | 89.3 |
| Comp. Ex. 6 | 198 | 173 | 89.3 |

TABLE 5

| | Discharge capacity (1st cycle) (mAh/g) | Discharge capacity (300th cycle) (mAh/g) | Discharge capacity retention (%) |
|---|---|---|---|
| Ex. 3 | 149 | 125 | 83.9 |
| Comp. Ex. 3 | 150 | 121 | 80.6 |
| Ex. 17 | 150 | 129 | 86.0 |
| Ex. 18 | 148 | 127 | 85.8 |
| Ex. 20 | 147 | 126 | 85.7 |

The results of the evaluation show that the lithium secondary batteries using the positive electrode active materials of Examples 1 to 20 exhibited higher high initial coulombic efficiency than the lithium secondary batteries using the positive electrode active materials of Comparative Examples 1 to 6.

The results of the evaluation also show that the lithium secondary batteries using the positive electrode active materials of Examples 3, 17, 18 and 20 exhibited higher cycle performance than the lithium secondary battery using the positive electrode active material of Comparative Example 3.

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
10 Lithium secondary battery
21 Positive electrode lead
31 Negative electrode lead

The invention claimed is:

1. A positive electrode active material, which has a crystallite size α/crystallite size β ratio (α/β) of 1 to 1.75, wherein the crystallite size α is within a peak region of 2θ=18.7±1° and the crystallite size β is within a peak region of 2θ=44.6±1°, each determined by a powder X-ray diffraction measurement using Cu-Kα ray, and has a composition represented by formula (I) below:

$$Li[Li_x(Ni_aCo_bMn_cM_d)_{1-x}]O_2 \qquad (I)$$

wherein $0 \leq x \leq 0.2$, $0.3 < a < 0.7$, $0 < b < 0.4$, $0 < c < 0.4$, $0 \leq d < 0.1$, $a+b+c+d=1$, M is at least one metal selected from the group consisting of Fe, Cr, Ti, Mg, Al and Zr, and a, b and c in the formula (I) satisfy the following relationship: $a > b+c$.

2. The positive electrode active material according to claim 1, wherein the crystallite size α/crystallite size β ratio (α/β) is 1 to 1.5.

3. The positive electrode active material according to claim 1, which has a BET specific surface area of 0.5 m²/g to 4 m²/g.

4. The positive electrode active material according to claim 1, wherein the crystallite size β is 150 Å to 650 Å.

5. The positive electrode active material according to claim 1, wherein the average primary particle diameter is 0.05 μm to 1 μm, and the volume-based 50% cumulative particle size $D_{50}$ is 1 μm to 10 μm.

6. The positive electrode active material according to claim 1, wherein the ratio ($D_{90}/D_{10}$) of volume-based 90% cumulative particle size $D_{90}$ to volume-based 10% cumulative particle size $D_{10}$ is in the range of from 2.0 to 3.5.

7. The positive electrode active material according to claim 1, which has a tapped bulk density of 1.2 g/cc to 2.0 g/cc.

8. A positive electrode for a lithium secondary battery, comprising the positive electrode active material of claim 1.

9. A lithium secondary battery, comprising the positive electrode of claim 8.

10. The positive electrode active material according to claim 1, wherein the average primary particle diameter is 0.05 μm to 0.5 μm.

* * * * *